(12) United States Patent
Cerezo-Galvez et al.

(10) Patent No.: US 11,819,025 B2
(45) Date of Patent: Nov. 21, 2023

(54) ACTIVE COMPOUND COMBINATIONS HAVING INSECTICIDAL/ACARICIDAL PROPERTIES

(71) Applicant: Bayer Aktiengesellschaft, Leverkusen (DE)

(72) Inventors: Silvia Cerezo-Galvez, Langenfeld (DE); Christian Marienhagen, Langenfeld (DE); Holger Weckwert, Leichlingen (DE); Wolfgang Thielert, Odenthal (DE); Marita John, Bottrop (DE)

(73) Assignee: Bayer Aktiengesellschaft, Leverkusen (DE)

( * ) Notice: Subject to any disclaimer, the term of this patent is extended or adjusted under 35 U.S.C. 154(b) by 19 days.

(21) Appl. No.: 16/756,796

(22) PCT Filed: Oct. 12, 2018

(86) PCT No.: PCT/EP2018/077882
§ 371 (c)(1),
(2) Date: Apr. 16, 2020

(87) PCT Pub. No.: WO2019/076754
PCT Pub. Date: Apr. 25, 2019

(65) Prior Publication Data
US 2020/0236938 A1    Jul. 30, 2020

(30) Foreign Application Priority Data
Oct. 18, 2017  (EP) ..................................... 17197098

(51) Int. Cl.
| A01N 43/78 | (2006.01) |
| A01N 43/56 | (2006.01) |
| A01N 63/30 | (2020.01) |

(52) U.S. Cl.
CPC ............. *A01N 43/78* (2013.01); *A01N 43/56* (2013.01); *A01N 63/30* (2020.01)

(58) Field of Classification Search
CPC ......... A01N 43/78; A01N 43/56; A01N 63/30
See application file for complete search history.

(56) References Cited

U.S. PATENT DOCUMENTS

| 8,946,234 | B2 * | 2/2015 | Maue ................... C07D 239/28 |
| | | | 514/406 |
| 9,642,363 | B2 * | 5/2017 | Koehler ................. A01N 43/86 |
| 10,051,861 | B2 | 8/2018 | Koehler |
| 11,058,114 | B2 * | 7/2021 | Alig ....................... A01N 41/10 |
| 11,191,271 | B2 * | 12/2021 | Cerezo-Galvez ...... A01N 37/22 |
| 2014/0315898 | A1 * | 10/2014 | Koehler ................. A01N 43/36 |
| | | | 514/227.2 |
| 2020/0236937 | A1 * | 7/2020 | Cerezo-Galvez ...... A01N 37/22 |
| 2020/0236942 | A1 * | 7/2020 | Cerezo-Galvez ...... A01N 43/90 |
| 2020/0288716 | A1 * | 9/2020 | Cerezo-Galvez ...... A01N 43/78 |

FOREIGN PATENT DOCUMENTS

| EP | 2090170 A1 | 8/2009 |
| EP | 2604118 A1 | 6/2013 |
| WO | WO-2013092350 A1 * | 6/2013 ........... C07D 211/72 |
| WO | WO2013092350 A1 | 6/2013 |

* cited by examiner

*Primary Examiner* — Yong L Chu
(74) *Attorney, Agent, or Firm* — MORRISON & FOERSTER LLP

(57) ABSTRACT

The present invention relates to novel active compound combinations comprising at least one known compound of the formula (I) and at least one further active compound, which combinations are highly suitable for controlling animal and microbial pests such as unwanted insects and/or unwanted acarids and/or unwanted nematodes.

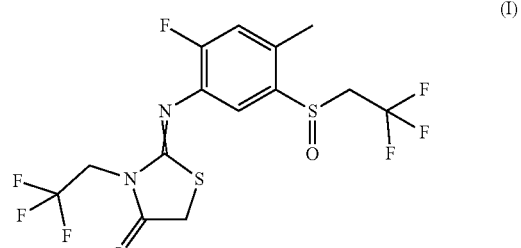

(I)

44 Claims, No Drawings

ACTIVE COMPOUND COMBINATIONS HAVING INSECTICIDAL/ACARICIDAL PROPERTIES

CROSS REFERENCE TO RELATED APPLICATIONS

This application is a national stage application under 35 U.S.C. § 371 of International Application No. PCT/EP2018/077882, filed internationally on Oct. 12, 2018, which claims the benefit of European Application No. 17197098.1, filed Oct. 18, 2017.

The present invention relates to active compound combinations comprising firstly at least one compound of formula (I) as shown below and secondly at least one active compound of group (II) selected from (a) Insecticide Groups (IRAC (Insecticide Resistance Action Committee) mode of action classification groups; also designated as "IRAC classification groups") (1), (12), (20), (21) and (30), (b) compounds of formula (IIa) or (IIb) as shown below, and (c) Biological Control Agent (BCA) Groups (1), (2) and (7). Such combinations are highly suitable for controlling animal and microbial pests, such as unwanted insects, especially acarids (mites), nematodes and as plant strengthening agents.

BACKGROUND

The compound of formula (I) and methods for its production are known from WO 2013/092350 and its insecticidal action has been described.

However, the acaricidal and/or insecticidal efficacy and/or the activity spectrum and/or the compatibility of the known compounds with plants, especially with respect to crop plants, is not always satisfactory. Therefore, novel active compound combinations with improved properties are in great demand.

It has now been found that an active compound combination comprising at least one compound of the formula (I)

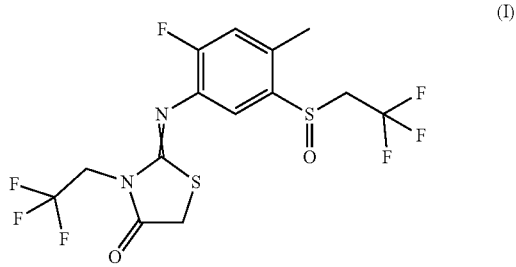

(I)

and at least one active compound of group (II) which is selected from
  (a) Insecticide Groups (IRAC classification groups) (1), (12), (20), (21) and (30), or
  (b) compounds of formula (IIa) or (IIb), or
  (c) Biological Control Agent (BCA) Groups (1), (2) and (7),
is highly suitable for the control of animal and microbial pests as well as plant strengthening agent. Especially, such active compound combinations have very good insecticidal, acaricidal and nematicidal properties.

In formula (I), the crossed double bond indicates that E- or Z-isomers of the compound are possible, i.e. the 5-membered ring might be present in two different orientations. According to the invention, the compound of formula (I) can be present in form of its E-isomer or in form of its Z-isomer or in form of a mixture of both E- and Z-isomers.

Such active compound combinations are very suitable for controlling animal and microbial pests such as insects and/or arachnids, especially acarids, and/or nematodes and/or fungi, and indirectly improve plant health. Further, such active compound combinations can be used for reducing overall damage of plants and plant parts as well as losses in harvested fruits or vegetables caused by such pests, e.g. insects, mites and phytopathogens. Further, such active compound combinations are suitable as plant strengthening agents.

Surprisingly, the insecticidal effect and/or arachnicidal/acaricidal effect and/or nematicidal effect and/or antimicrobial effect and/or the fungicidal effect and/or the plant-strengthening effect and/or the yield-increasing effect of the active compound combinations according to the invention is substantially higher than the sum of the effects of the individual active ingredients. There is an unpredictable real synergistic effect and not just a complementary/additive effect.

The active compound combinations according to the invention preferably comprise the compound of formula (I) and the compound of group (II) in synergistically effective amounts. Group II consists of
  (a) Insecticide Groups (IRAC (Insecticide Resistance Action Committee) mode of action classification groups; also designated as "IRAC classification groups") (1), (12), (20), (21) and (30),
  (b) compounds of formula (IIa) or (IIb) as shown below, and
  (c) Biological Control Agent (BCA) Groups (1), (2) and (7).

Therefore, the at least one active compound of group (II) is selected from (a), (b) or (c). These groups (a), (b) and (c) are further defined as follows:
  (a) Insecticide Groups (IRAC classification groups):
  (1) Acetylcholinesterase (AChE) inhibitors, such as, for example, carbamates, for example alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organophosphates, for example acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion, wherein said mentioned compounds are preferred.
  (12) Inhibitors of mitochondrial ATP synthase, such as, ATP disruptors such as, for example, diafenthiuron or organotin compounds, for example azocyclotin, cyhexatin and fenbutatin oxide or propargite or tetradifon, wherein said mentioned compounds are preferred.

(20) Mitochondrial complex III electron transport inhibitors, such as, for example, hydramethylnone or acequinocyl or fluacrypyrim, wherein said mentioned compounds are preferred.

(21) Mitochondrial complex I electron transport inhibitors, such as, for example from the group of the METI acaricides, e.g. fenazaquin, fenpyroximate, pyrimidifen, pyridaben, tebufenpyrad and tolfenpyrad or rotenone (Derris), wherein said mentioned compounds are preferred.

(30) further active compounds selected from Afidopyropen, Afoxolaner, Azadirachtin, Benclothiaz, Benzoximate, Bifenazate, Broflanilide, Bromopropylate, Chinomethionat, Chloroprallethrin, Cryolite, Cyclaniliprole, Cycloxaprid, Cyhalodiamide, Dicloromezotiaz, Dicofol, epsilon-Metofluthrin, epsilon-Momfluthrin, Flometoquin, Fluazaindolizine, Fluensulfone, Flufenerim, Flufenoxystrobin, Flufiprole, Fluhexafon, Fluopyram, Fluralaner, Fluxametamide, Fufenozide, Guadipyr, Heptafluthrin, Imidaclothiz, Iprodione, kappa-Bifenthrin, kappa-Tefluthrin, Lotilaner, Meperfluthrin, Paichongding, Pyridalyl, Pyrifluquinazon, Pyriminostrobin, Spirobudiclofen, Tetramethylfluthrin, Tetraniliprole, Tetrachlorantraniliprole, Tigolaner, Tioxazafen, Thiofluoximate, Triflumezopyrim and iodomethane; furthermore preparations based on *Bacillus firmus* (I-1582, BioNeem, Votivo), and also the following compounds: 1-{2-fluoro-4-methyl-5-[(2,2,2-trifluoroethyl)sulphinyl]phenyl}-3-(trifluoromethyl)-1H-1,2,4-triazole-5-amine (known from WO2006/043635) (CAS 885026-50-6), {1'-[(2E)-3-(4-chlorophenyl)prop-2-en-1-yl]-5-fluorospiro[indol-3,4'-piperidin]-1(2H)-yl}(2-chloropyridin-4-yl)methanone (known from WO2003/106457) (CAS 637360-23-7), 2-chloro-N-[2-{1-[(2E)-3-(4-chlorophenyl)prop-2-en-1-yl]piperidin-4-yl}-4-(trifluoromethyl)phenyl]isonicotinamide (known from WO2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010052161) (CAS 1225292-17-0), 3-(4-chloro-2,6-dimethylphenyl)-8-methoxy-2-oxo-1,8-diazaspiro[4.5]dec-3-en-4-yl ethyl carbonate (known from EP2647626) (CAS 1440516-42-6), 4-(but-2-yn-1-yloxy)-6-(3,5-dimethylpiperidin-1-yl)-5-fluoropyrimidine (known from WO2004/099160) (CAS 792914-58-0), PF1364 (known from JP2010/018586) (CAS 1204776-60-2), N-[(2E)-1-[(6-chloropyridin-3-yl)methyl] pyridin-2(1H)-ylidene]-2,2,2-trifluoroacetamide (known from WO2012/029672) (CAS 1363400-41-2), (3E)-3-[1-[(6-chloro-3-pyridyl)methyl]-2-pyridylidene]-1,1,1-trifluoro-propan-2-one (known from WO2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)-benzamide, 4-[5-(3,5-dichlorophenyl)-4,5-dihydro-5-(trifluoromethyl)-3-isoxazolyl]-2-methyl-N-(trans-1-oxido-3-thietanyl)-benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]-propanamide, (+)-N-[3-chloro-1-(3-pyridinyl)-1H-pyrazol-4-yl]-N-ethyl-3-[(3,3,3-trifluoropropyl)sulfinyl]-propanamide and (−)-N-[3-chloro-1-(3-pyridinyl)-1H-pyrazol-4-yl]-N-ethyl-3-[(3,3,3-trifluoropropyl)sulfinyl]-propanamide (known from WO 2013/162715 A2, WO 2013/162716 A2, US 2014/0213448 A1) (CAS 1477923-37-7), 5-[[(2E)-3-chloro-2-propen-1-yl] amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide, (Liudaibenjiaxuanan, known from CN 103109816 A) (CAS 1232543-85-9) ; N-[4-chloro-2-[[(1,1-dimethylethyl) amino]carbonyl]-6-methylphenyl]-1-(3-chloro-2-pyridinyl)-3-(fluoromethoxy)-1H-Pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy]phenoxy]propoxy]-2-methoxy-6-(trifluoromethyl)-pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]-hydrazinecarboxamide (known from CN 101715774 A) (CAS 1232543-85-9); 3-(2,2-dichloroethenyl)-2,2-dimethyl-4-(1H-benzimidazol-2-yl)phenyl-cyclopropanecarboxylic acid ester (known from CN 103524422 A) (CAS 1542271-46-4); (4 aS)-7-chloro-2,5-dihydro-2-[[(methoxycarbonyl)[4-[(trifluoromethyl)thio] phenyl]amino]carbonyl]-indeno[1,2-e][1,3,4]oxadiazine-4a (3H)-carboxylic acid methyl ester (known from CN 102391261 A) (CAS 1370358-69-2); 6-deoxy -3-O-ethyl-2, 4-di-O-methyl-, 1-[N-[4-[1-[4-(1,1,2,2,2-pentafluoroethoxy)phenyl]-1H-1,2,4-triazol-3-yl]phenyl]carbamate]-α-L-mannopyranose (known from US 2014/0275503 A1) (CAS 1181213-14-8); 8-(2-cyclopropylmethoxy-4-trifluoromethyl-phenoxy)-3-(6-trifluoromethyl-pyridazin-3-yl)-3-aza-bicyclo[3.2.1]octane (CAS 1253850-56-4), (8-anti)-8-(2-cyclopropylmethoxy-4-trifluoromethyl-phenoxy)-3-(6-trifluoromethyl-pyridazin-3-yl)-3-aza-bicyclo[3.2.1]octane (CAS 933798-27-7), (8-syn)-8-(2-cyclopropylmethoxy-4-trifluoromethyl-phenoxy)-3-(6-trifluoromethyl-pyridazin-3-yl)-3-aza-bicyclo[3.2.1]octane (known from WO 2007040280 A1, WO 2007040282 A1) (CAS 934001-66-8), N-[3-chloro-1-(3-pyridinyl)-1H-pyrazol-4-yl]-N-ethyl-3-[(3,3,3-trifluoropropyl)thio]-propanamide (known from WO 2015/058021 A1, WO 2015/058028 A1) (CAS 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl]methoxy]-pyrimidine (known from WO 2013/115391 A1) (CAS 1449021-97-9), 3-(4-chloro-2,6-dimethylphenyl)-4-hydroxy-8-methoxy-1-methyl-1,8-diazaspiro[4.5]dec-3-en-2-one (known from WO 2010/066780 A1, WO 2011/151146 A1) (CAS 1229023-34-0), 3-(4-chloro-2,6-dimethylphenyl)-8-methoxy-1-methyl-1,8-diazaspiro[4.5]decane-2,4-dione (known from WO 2014/187846 A1) (CAS 1638765-58-8), 3-(4-chloro-2,6-dimethylphenyl)-8-methoxy-1-methyl-2-oxo-1,8-diazaspiro[4.5]dec-3-en-4-yl-carbonic acid ethyl ester (known from WO 2010/066780 A1, WO 2011151146 A1) (CAS 1229023-00-0), N-[1-[(6-chloro-3-pyridinyl)methyl]-2(1H)-pyridinylidene]-2,2,2-trifluoro-acetamide (known from DE 3639877 A1, WO 2012029672 A1) (CAS 1363400-41-2), [N(E)]-N-[1-[(6-chloro-3-pyridinyl)methyl]-2(1H)-pyridinylidene]-2,2,2-trifluoro-acetamide, (known from WO 2016005276 A1) (CAS 1689566-03-7), [N(Z)]-N-[1-[(6- chloro-3-pyridinyl)methyl]-2(1H)-pyridinylidene]-2,2,2-trifluoro-acetamide, (CAS 1702305-40-5), 3-endo-3-[2-propoxy-4-(trifluoromethyl)phenoxy]-9-[[5-(trifluoromethyl)-2-pyridinyl]oxy]-9-azabicyclo[3.3.1]nonane (known from WO 2011/105506 A1, WO 2016/133011 A1) (CAS 1332838-17-1), and a formulation comprising the three terpenes α-terpinene, p-cymene and limonene (preferably comprising 15%-18% (w/w) terpenes), wherein said mentioned compounds and formulations are preferred.

(b) Compounds of formula (IIa) or (IIb):
Compound of formula (IIa):

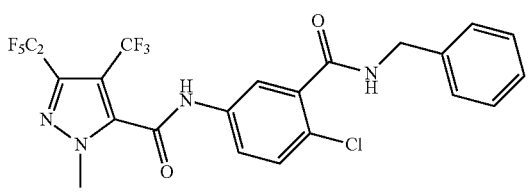

(IIa), known from WO 2010/051926 A1.
Compound of formula (IIb):

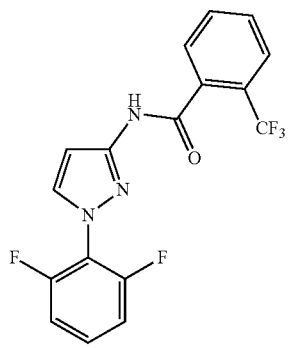 [SMILES: O=C(Nc1ccn(-c2c(F)cccc2F)n1)c1ccccc1C(F)(F)F]

(IIb) (N-[1-(2,6-difluorophenyl)-1H-pyrazol-3-yl]-2-(trifluoromethyl)benzamide), known from WO 2014/053450 A1.

(c) Biological Control Agent (BCA) Groups:
Biological control agents are, in particular, bacteria, fungi or yeasts and botanicals, especially botanical extracts. Therefore, the Biological Control Agent (BCA) Groups (1), (2) and (7) according to the invention are:
BCA Group (1): bacteria
BCA Group (2): fungi or yeasts
BCA Group (7): botanicals, especially botanical extracts.
These Biological Control Agent (BCA) Groups (1), (2) and (7) are further characterized as follows:

(1) According to the invention biological control agents which are summarized under the term "bacteria" include but are not limited to spore-forming, root-colonizing bacteria, or bacteria useful as bioinsecticide, biofungicide or bionematicide. Such bacteria to be used or employed according to the invention include but are not limited to:

(1.1) *Agrobacterium radiobacter*, in particular strain K84 (product known as Galltrol-A from AgBioChem, CA) or strain K1026 (product known as Nogall from Becker Underwood, US), (1.2) *Agrobacterium vitis*, in particular the non-pathogenic strain VAR03-1, (1.3) *Azorhizobium caulinodans*, preferably strain ZB-SK-5, (1.4) *Azospirillum amazonense*, (1.5) *Azospirillum brasilense*, (1.6) *Azospirillum halopraeference*, (1.7) *Azospirillum irakense*, (1.8) *Azospirillum lipoferum*, (1.9) *Azotobacter chroococcum*, preferably strain H 23 (CECT 4435) (cf. Applied Soil Ecology 12 (1999) 51±59), (1.10) *Azotobacter vinelandii*, preferably strain ATCC 12837 (cf. Applied Soil Ecology 12 (1999) 51±59), (1.11) *Bacillus* sp. strain AQ175 (ATCC Accession No. 55608), (1.12) *Bacillus* sp. strain AQ177 (ATCC Accession No. 55609), (1.13) *Bacillus* sp. strain AQ178 (ATCC Accession No. 53522), (1.14) *Bacillus acidocaldarius*, (1.15) *Bacillus acidoterrestris*, (1.16) *Bacillus agri* (cf. WO 2012/140207), (1.17) *Bacillus aizawai* (cf. WO 2012/140207), (1.18) *Bacillus albolactis* (cf. WO 2012/140207), (1.19) *Bacillus alcalophilus*, (1.20) *Bacillus alvei*, (1.21) *Bacillus aminoglucosidicus*, (1.22) *Bacillus aminovorans*, (1.23) *Bacillus amylolyticus* (also known as *Paenibacillus amylolyticus*), (1.24) *Bacillus amyloliquefaciens*, in particular strain IN937a (cf. WO 2012/140207), or strain FZB42 (DSM 231179) (product known as RhizoVital® from ABiTEP, DE), or strain B3, or strain D747, (products known as Bacstar® from Etec Crop Solutions, NZ, or Double Nickel™ from Certis, US), (1.25) *Bacillus aneurinolyticus*, (1.26) *Bacillus atrophaeus*, (1.27) *Bacillus azotoformans*, (1.28) *Bacillus badius*, (1.29) *Bacillus cereus* (synonyms: *Bacillus endorhythmos*, *Bacillus medusa*), in particular spores of *B. cereus* strain CNCM 1-1562 (cf. U.S. Pat. No. 6,406,690), or strain BP01 (ATCC 55675), (products known as Mepichlor from Arysta, US or Mepplus, Micro-Flo Company LLC, US), (1.30) *Bacillus chitinosporus*, in particular strain AQ746 (Accession No. NRRL B-21618), (1.31) *Bacillus circulans* (1.32) *Bacillus coagulans*, in particular strain TQ33, (1.33) *Bacillus fastidiosus*, (1.34) *Bacillus firmus*, in particular strain 1-1582 (products known as Bionem or VOTIVO from Bayer AG), (1.35) *Bacillus kurstaki*, (1.36) *Bacillus lacticola*, (1.37) *Bacillus lactimorbus*, (1.38) *Bacillus lactis*, (1.39) *Bacillus laterosporus* (also known as *Brevibacillus laterosporus*), (product known as Bio-Tode from Agro-Organics, SA), (1.40) *Bacillus lautus*, (1.41) *Bacillus lentimorbus*, (1.42) *Bacillus lentus*, (1.43) *Bacillus licheniformis*, in particular strain SB3086 (product known as EcoGuard™ Biofungicide or Green Releaf from Novozymes Biologicals, US), (1.44) *Bacillus maroccanus*, (1.45) *Bacillus medusa*, (1.46) *Bacillus megaterium*, (products known as Bioarc®, from BioArc), or *B. megaterium* strain YFM3.25, (1.47) *Bacillus metiers*, (1.48) *Bacillus mojavensis*, in particular strain SR11 (CECT-7666), (1.49) *Bacillus mycoides*, in particular strain AQ726 (Accession No. NRRL B21664) or isolate J, (product known as BmJ from Certis USA), (1.50) *Bacillus nematocida*, (1.51) *Bacillus nigrificans*, (1.52) *Bacillus popilliae*, (product known as Cronox from Bio-Crop, CO), (1.53) *Bacillus psychrosaccharolyticus*, (1.54) *Bacillus pumilus*, in particular strain GB34 (Accession No. ATCC 700814), (products known as Yield Shield® from Bayer AG, DE), and strain QST2808 (Accession No. NRRL B-30087), (products known as Sonata QST 2808® from Bayer AG), or strain BU F-33, (product known as Integral F-33 from Becker Underwood, US), or strain AQ717 (Accession No. NRRL B21662), (1.55) *Bacillus siamensis*, in particular strain KCTC 13613T, (1.56) *Bacillus smithii*, (1.57) *Bacillus sphaericus*, in particular Serotype H5a5b strain 2362, (product known as VectoLex° from Valent BioSciences, US), (1.58) *Bacillus subtilis*, in particular strain GB03 (Accession No. ATCC SD-1397), (product known as Kodiak® from Bayer AG, DE), and strain QST713/AQ713 (Accession No. NRRL B-21661), (products known as Serenade QST 713®, Serenade Soil and Serenade Max from Bayer AG) and strain AQ 153 (ATCC accession No. 55614), and strain AQ743 (Accession No.

NRRL B-21665), and strain DB 101, (products known as Shelter from Dagutat Bio lab, ZA), and strain DB 102, (product known as Artemis from Dagutat Bio lab, ZA), and strain MBI 600, (products known as Subtilex from Becker Underwood, US), or *B. subtilis* var. *amyloliquefaciens* strain FZB24, (product known as Taegro® from Novozymes, US), or *B. subtilis* subspecies natto (formerly *B. natto*), or *B. subtilis* isolate B246, (product known as Avogreen from RE at UP) or strain MBI600 (products known as Subtilex or HiStick N/T from Becker Underwood), or strain QST30002/AQ30002 (Accesion No. NRRL B-50421, cf. WO 2012/087980), or strain QST30004/AQ30004 (Accession No. NRRL B-50455, cf. WO 2012/087980), (1.59) *Bacillus tequilensis*, in particular strain NII-0943, (1.60) *Bacillus thuringiensis*, in particular *B. thuringiensis* subspecies *israelensis* (serotype H-14), strain AM65-52 (Accession No. ATCC 1276), (product known as VectoBac® from Valent BioSciences, US), or *B. th. israelensis* strain BMP 144, (product known as Aquabac from Becker Microbial Products IL), or *B. thuringiensis* subsp. *aizawai*, in particular strain ABTS-1857 (SD-1372), (products known as XenTari® from Bayer AG, DE) or strain GC-91 (Accession No. NCTC 11821), or serotype H-7, (product known as Florbac WG from Valent BioSciences, US), or *B. thuringiensis* subsp. *kurstaki* strain HD-1, (product known as Dipel® ES from Valent BioSciences, US), or strain BMP 123 from Becker Microbial Products, IL, or strain ABTS 351 (Accession No. ATCC SD-1275), or strain PB 54 (Accession No. CECT 7209), or strain SA 11 (Accession No. NRRL B-30790), or strain SA 12 (Accession No. NRRL B-30791), or strain EG 2348 (Accession No. NRRL B-18208), or strain EG-7841 (product known as Crymax from Certis USA), or *B. thuringiensis* subsp. *tenebrionis* strain NB 176 (SD-5428), (product known as Novodor® FC from BioFa DE), or *B. thuringiensis* subspecies. *aegypti*, (product known as Agerin), or *B. thuringiensis* var. *colmeri* (product known as TianBaoBTc from Changzhou Jianghai Chemical Factory), or *B. thuringiensis* var. *darmstadiensis* strains 24-91 (product known as Baciturin), or *B. thuringiensis* var. *dendrolimus* (products known as Dendrobacillin), or *B. thuringiensis* subsp. *galleriae* (product known as GrubGone or BeetleGone from Phyllom BioProducts), or *B. thuringiensis* var. *japonensis* strain Buibui, or *B. thuringiensis* subsp. *morrisoni*, or *B. thuringiensis* var. *san diego* (product known as M-One® from Mycogen Corporation, US), or *B. thuringiensis* subsp. *thuringiensis* serotype 1, strain MPPL002, or *B. thuringiensis* var. *thuringiensis*, or *B. thuringiensis* var 7216 (product known as Amactic, Pethian), or *B. thuringiensis* var T36 (product known as Cahat) or *B. thuringiensis* strain BD #32 (Accession No. NRRL B-21530) from Bayer AG, DE, or *B. thuringiensis* strain AQ52 (Accession No. NRRL B-21619) from Bayer AG, DE, or *B. thuringiensis* strain CR-371 (Accession No. ATCC 55273), (1.61) *Bacillus uniflagellatus*, (1.62) *Bradyrhizobium japonicum* (product known as Optimize from Novozymes), (1.63) *Brevibacillus brevis* (formerly *Bacillus brevis*), (product known as Brevisin), in particular strains SS86-3, SS86-4, SS86-5, 2904, (1.64) *Brevibacillus laterosporus* (formerly *Bacillus laterosporus*), in particular strains ATCC 64, NRS 1111, NRS 1645, NRS 1647, BPM3, G4, NCIMB 41419, (1.65) *Burkholderia* spp., in particular strain A396 (Accession No. NRRL B-50319), (product known as MBI-206 TGAI from Marrone Bio Innovations), or *B. cepacia* (product known as Deny from Stine Microbial Products), (1.66) *Chromobacterium subtsugae*, in particular strain PRAA4-1T (MBI-203), (product known as Grandevo from Marrone Bio Innovations), (1.67) *Corynebacterium paurometabolum*, (1.68) *Delftia acidovorans*, in particular strain RAY209 (product known as BioBoost® from Brett Young Seeds), (1.69) *Gluconacetobacter diazotrophicus*, (1.70) *Herbaspirilum rubrisubalbicans*, (1.71) *Herbaspirilum seropedicae*, (1.72) *Lactobacillus* sp. (product known as Lactoplant from LactoPAFI), (1.73) *Lactobacillus acidophilus* (product known as Fruitsan from Inagrosa-Industrias Agrobiológicas, S.A), (1.74) *Lysobacter antibioticus*, in particular strain 13-1 (cf. Biological Control 2008, 45, 288-296), (1.75) *Lysobacter enzymogenes*, in particular strain C3 (cf. J Nematol. 2006 June; 38(2): 233-239), (1.76) *Paenibacillus alvei*, in particular strains III3DT-1A, III2E, 46C3, 2771 (*Bacillus* genetic stock center, November 2001), (1.77) *Paenibacillus macerans*, (1.78) *Paenibacillus polymyxa*, in particular strain AC-1 (product known as Topseed from Green Biotech Company Ltd.), (1.79) *Paenibacillus popilliae* (formerly *Bacillus popilliae*) product known as Milky spore disease from St. Gabriel Laboratories), (1.80) *Pantoea agglomerans*, in particular strain E325 (Accession No. NRRL B-21856), (product known as Bloomtime Biological FD Biopesticide from Northwest Agricultural Products), (1.81) *Pasteuria nishizawae* (product known as oyacyst LF/ST from *Pasteuria* Bioscience), (1.82) *Pasteuria penetrans* (formerly *Bacillus penetrans*), (product known as *Pasteuria* wettable powder from *Pasteuria* Bioscience), (1.83) *Pasteuria ramosa*, (1.84) *Pasteuria reniformis*, (1.85) *Pasteuria thornei*, (1.86) *Pasteuria usgae* (products known as Econem™ from *Pasteuria* Bioscience), (1.87) *Pectobacterium carotovorum* (formerly *Erwinia carotovora*), (product known as BioKeeper from Nissan, JP), (1.88) *Pseudomonas aeruginosa*, in particular strains WS-1 or PN1, (1.89) *Pseudomonas aureofaciens*, in particular strain TX-1 (product known as Spot-Less Biofungicide from Eco Soils Systems, CA), (1.90) *Pseudomonas cepacia* (formerly known as *Burkholderia cepacia*), in particular type Wisconsin, strains M54 or J82, (1.91) *Pseudomonas chlororaphis*, in particular strain MA 342 (products known as Cedomon from Bioagri, S), or strain 63-28 (product known as ATEze from EcoSoil Systems, US), (1.92) *Pseudomonas fluorescens*, in particular strain A506 (products known as Blightban from NuFarm or Frostban B from Frost Technology Corp), or strain 1629RS (product known as Frostban D from Frost Technology Corp), (1.93) *Pseudomonas proradix* (product known as Proradix® from Sourcon Padena), (1.94) *Pseudomonas putida*, (1.95) *Pseudomonas resinovorans* (product known as Solanacure from Agricultural Research Council, SA), (1.96) *Pseudomonas syringae*, in particular strain MA-4 (product known as Biosave from EcoScience, US), or strain 742RS (product known as Frostban C from Frost Technology Corp, (1.97) *Rhizobium fredii*, (1.98) *Rhizobium leguminosarum*, in particular by. viceae strain Z25 (Accession No. CECT 4585), (1.99) *Rhizobium loti*, (1.100) *Rhizobium meliloti*, (1.101) *Rhizobium trifolii*, (1.102) *Rhizobium tropici*, (1.103) *Rhodococcus globerulus* strain AQ719 (Accession No. NRRL B21663) from Bayer AG, DE, (1.104) *Serratia entomophila* (product known as Invade® from Wrightson Seeds), (1.105) *Serratia marcescens*, in particular strain SRM (Accession No. MTCC 8708) or strain R35, (1.106) *Streptomyces* sp. strain NRRL B-30145 from Bayer AG, DE, or strains WYE 20 (KCTC 0341BP) and WYE 324 (KCTC0342BP), (1.107) *Streptomyces acidiscabies*, in particular strain RL-110T, (product known as MBI-005EP from Marrone Bioinnovations, CA), (1.108) *Streptomyces candidus*, in particular strain Y21007-2, (products known as BioBac or BioAid from Biontech, TW), (1.109) *Streptomyces colombiensis* (1.110) *Streptomyces galbus* (=*Streptomyces griseoviridis*), in particular strain K61 (Accession No.

DSM 7206) (product known as Mycostop® from Verdera, cf. Crop Protection 2006, 25, 468-475) or strain QST 6047 (=strain NRRL B-30232) (product known as Virtuoso from Bayer AG, DE), (1.111) *Streptomyces goshikiensis*, (1.112) *Streptomyces lavendulae*, (1.113) *Streptomyces lydicus*, in particular strain WYCD108US) or strain WYEC108 (product known as Actinovate from Natural Industries, US), (1.114) *Streptomyces microflavus*, in particular strain AQ6121 (=QRD 31.013, NRRL B-50550) from Bayer AG, or strain M (=AQ6121.002) (091013-02 deposited with the Canadian International Depository Authority) from Bayer AG, (1.115) *Streptomyces prasinus* (cf. "Prasinons A and B: potent insecticides from *Streptomyces prasinus*", Applied microbiology 1973 November), (1.116) *Streptomyces rimosus*, (1.117) *Streptomyces saraceticus* (product known as Clanda from A & A Group (Agro Chemical Corp.)), (1.118) *Streptomyces venezuelae*, (1.119) *Thiobacillus* sp. (product known as Cropaid from Cropaid Ltd UK), (1.120) *Virgibacillus pantothenticus* (formerly *Bacillus pantothenticus*), in particular strain ATCC 14576/DSM 491, (1.121) *Xanthomonas campestris* (herbicidal activity), in particular pv poae (product known as Camperico), (1.122) *Xenorhabdus* (=*Photorhabdus*) *luminescens*, and (1.123) *Xenorhabdus* (=*Photorhabdus*) *nematophila*, wherein said mentioned bacteria are preferred.

(2) According to the invention biological control agents that are summarized under the term "fungi" or "yeasts" include but are not limited to:

(2.1) *Ampelomyces quisqualis*, in particular strain AQ 10 (Accession No. CNCM 1-807) (product known as AQ 10® from IntrachemBio Italia), (2.2) Arkansas Fungus 18 (ARF18, cf. WO2012/140207), (2.3) *Arthrobotrys dactyloides* (cf. WO 2012/140207), (2.4) *Arthrobotrys oligospora* (cf. WO 2012/140207), (2.5) *Arthrobotrys superba*, (cf. WO 2012/140207), (2.6) *Aschersonia aleyrodis* (cf. Berger, 1921. Bull. State Pl. Bd. 5:141), (2.7) *Aspergillus flavus*, in particular strain NRRL 21882 (product known as AflaGuard® from Syngenta) or strain AF36 (product known as AF36 from Arizona Cotton Research and Protection Council, US), (2.8) *Aureobasidium pullulans*, in particular blastospores of strain DSM14940 or blastospores of strain DSM 14941 or mixtures thereof (products known as Botector® or Blossom Protect® from bio-ferm, CH), (2.9) *Beauveria bassiana*, in particular strain ATCC 74040 (product known as Naturalis® from Intrachem Bio Italia) and strain GHA (Accession No. ATCC74250) (products known as BotaniGuard Es or Mycontrol-O from Laverlam International Corporation), or strain ATP02 (Accession No. DSM 24665, cf. WO/2011/117351), or strain CG 716 (product known as BoveMax® from Novozymes), or strain ANT-03 (from Anatis Bioprotection, CA), (2.10) *Beauveria brongniartii* (product known as Beaupro from Andermatt Biocontrol AG), (2.11) *Candida oleophila*, in particular strain O (product known as Nexy from BioNext) or isolate 1-182 (product known as Aspire® from Ecogen, US), (2.12) *Candida saitoana*, in particular strain NRRL Y-21022 (cf. U.S. Pat. No. 5,591,429), (2.13) *Chaetomium cupreum*, (2.14) *Chaetomium globosum*, (2.15) *Cladosporium cladosporioides*, in particular strain H39, (2.16) *Colletotrichum gloeosporioides*, in particular strain ATCC 20358, (2.17) *Conidiobolus obscurus*, (2.18) *Coniothyrium minitans*, in particular strain CON/M/91-8 (Accession No. DSM-9660), (product known as Contans ® from Bayer AG, DE), (2.19) *Cryptococcus albidus* (product known as YieldPlus® from Anchor Bio-Technologies, ZA), (2.20) *Cryptococcus flavescens*, in particular strain 3C (NRRL Y-50378) and strain 4C (NRRL Y-50379) (described in U.S. Pat. No. 8,241,889), (2.21) *Cylindrocarpon heteronema*, (2.22) *Dactylaria candida*, (2.23) *Dilophosphora alopecuri* (product known as Twist Fungus®), (2.24) *Entomophthora virulenta* (product known as Vektor), (2.25) *Exophiala jeanselmei*, (2.26) *Exophilia pisciphila*, (2.27) *Fusarium oxysporum*, in particular strain Fo47 (non-pathogenic) (product known as Fusaclean from Natural Plant Protection, FR), (2.28) *Fusarium solani*, for example strain Fs5 (non-pathogenic), (2.29) *Gigaspora margarita*, (2.30) *Gigaspora monosporum*, (2.31) *Gliocladium catenulatum* (Synonym: *Clonostachys rosea* f. *catenulate*) in particular strain J1446 (products known as Prestop from AgBio Inc. or Primastop® from Kemira Agro Oy), (2.32) *Gliocladium roseum*, in particular strain 321U, (2.33) *Glomus aggregatum*, (2.34) *Glomus brasilianum*, (2.35) *Glomus clarum*, (2.36) *Glomus deserticola*, (2.37) *Glomus etunicatum*, (2.38) *Glomus intraradices*, (2.39) *Glomus iranicum*, (2.40) *Glomus monosporum*, (2.41) *Glomus mosseae*, (2.42) *Harposporium anguillullae*, (2.43) *Hirsutella citriformis*, (2.44) *Hirsutella minnesotensis*, (2.45) *Hirsutella rhossiliensis*, (2.46) *Hirsutella thompsonii* (products known as Mycohit or ABTEC from Agro Bio-tech Research Centre, IN), (2.47) *Laccaria bicolor*, (2.48) *Laccaria laccata*, (2.49) *Lagenidium giganteum* (product known as Laginex®, Bayer AG, DE), (2.50) *Lecanicillium* spp., in particular strain HRO LEC 12 from Bayer AG, DE, (2.51) *Lecanicillium lecanii* (formerly known as *Verticillium lecanii*) in particular conidia of strain KV01 (products known as Mycotal® or Vertalec®, Koppert/Arysta), or strain DAOM198499, or strain DAOM216596, (2.52) *Lecanicillium muscarium* (formerly *Verticillium lecanii*), in particular strain 1/1 from Bayer AG, DE, or strain VE 6/CABI(=IMI) 268317/CBS102071/ARSEF5128, (2.53) *Meristacrum asterospermum* (2.54) *Metarhizium anisopliae*, in particular strain F52 (DSM3884/ATCC 90448) (products known as BIO 1020, Bayer AG, DE, or Met52, Novozymes), or *M. anisopliae* var *acridum* (product known as GreenGuard, Becker Underwood, US), or *M. anisopliae* var *acridum* isolate IMI 330189 (ARSEF7486), (product known as Green Muscle from Biological Control Products), (2.55) *Metarhizium flavoviride*, (2.56) *Metschnikowia fructicola*, in particular the strain NRRL Y-30752 (product known as Shemer from Bayer AG, DE), (2.57) *Microdochium dimerum*, in particular strain L13 (products known as ANTIBOT® from Agrauxine), (2.58) *Microsphaeropsis ochracea* (product known as Microx® from Bayer AG, DE), (2.59) *Monacrosporium cionopagum*, (2.60) *Monacrosporium psychrophilum*, (2.61) *Monacrosporium drechsleri*, (2.62) *Monacrosporium gephyropagum* (2.63) *Mucor haemelis* (product known as BioAvard from Indore Biotech Inputs & Research), (2.64) *Muscodor albus*, in particular strain QST 20799 (Accession No. NRRL 30547) (products known as Arabesque™, Glissadem, or Andante™ from Bayer AG, DE), (2.65) *Muscodor roseus* strains A3-5 (Accession No. NRRL 30548), (2.66) *Myrothecium verrucaria*, in particular strain AARC-0255 (product known as DiTera™ from Valent Biosciences), (2.67) *Nematoctonus geogenius*, (2.68) *Nematoctonus leiosporus*, (2.69) *Neocosmospora vasinfecta*, (2.70) *Nomuraea rileyi*, in particular strains SA86101, GU87401, SR86151, CG128 and VA9101, (2.71) *Ophiostoma piliferum*, in particular strain D97 (product known as Sylvanex), (2.72) *Paecilomyces fumosoroseus* (new: *Isaria fumosorosea*), in particular strain IFPC 200613, or strain apopka 97 (product known as PreFeRal® WG from Biobest) or strain FE 9901 (products known as NoFly® from Natural Industries Inc., US), (2.73) *Paecilomyces lilacinus*, in particular spores of *P. lilacinus* strain 251 (AGAL 89/030550), (product known as BioAct® from Bayer AG, DE; cf. *Crop Protection* 2008, 27, 352-361), (2.74) *Paecilomyces variotii*, in particular strain Q-09 (product known as Nemaquim® from Quimia, MX), (2.75) *Pandora delphacis*, (2.76) *Paraglomus* sp, in particular *P. brasilianum*, (2.77) *Penicillium bilaii*, in particular strain ATCC 22348 (products known as JumpStart® from Novozymes, PB-50, Provide), (2.78) *Penicillium vermiculatum*, (2.79) *Phlebiopsis* (or *Phlebia* or *Peniophora*) *gigantea*, in particular the strains VRA 1835 (ATCC 90304), VRA 1984 (DSM16201), VRA 1985 (DSM16202), VRA 1986 (DSM16203), FOC PG B20/5 (IMI390096), FOC PG SP log6 (IMI390097), FOC PG SP log5 (IMI390098), FOC PG BU3 (IMI390099), FOC PG BU4 (IMI390100), FOC PG 410.3 (IMI390101), FOC PG 97/1062/116/1.1 (IMI390102), FOC PG B22/SP1287/3.1 (IMI390103), FOC PG SH1 (IMI390104), FOC PG B22/SP1190/3.2 (IMI390105), (products known as Rotstop® from Verdera, FIN, PG-Agromaster®, PG-Fungler®, PG-IBL®, PG-Poszwald®, Rotex® from e-nema, DE), (2.80) *Phoma macrostroma*, in particular strain 94-44B (products known as Phoma H or Phoma P from Scotts, US), (2.81) *Pichia anomala*, in particular strain WRL-076 (NRRL Y-30842), (2.82) *Pisolithus tinctorius*, (2.83) *Pochonia chlamydosporia* (also known as *Vercillium chlamydosporium*), in particular var *catenulata* (IMI SD 187) (product known as KlamiC from The National Center of Animal and Plant Health (CENSA), CU), or *P. chlamydosporia* var *chlamydosporia* (resp. *V. chlamydosporium* var *chlamydosporium*), (2.84) *Pseudozyma aphidis* (2.85), *Pseudozyma flocculosa*, in particular strain PF-A22 UL (product known as Sporodex ® L from Plant Products Co., CA), (2.86) *Pythium oligandrum*, in particular strain DV74 or M1 (ATCC 38472), (product known as Polyversum from Biopreprary, CZ), (2.87) *Rhizopogon amylopogon*, (2.88) *Rhizopogon fulvigleba*, (2.89) *Rhizopogon luteolus*, (2.90) *Rhizopogon tinctorus*, (2.91) *Rhizopogon villosullus*, (2.92) *Saccharomyces cerevisae*, in particular strain CNCM No. 1-3936, strain CNCM No. 1-3937, strain CNCM No. 1-3938, strain CNCM No. 1-3939 (patent application US 2011/0301030), (2.93) *Scleroderma citrinum*, (2.94) *Sclerotinia minor*, in particular strain IMI 344141 (product known as Sarritor), (2.95) *Sporothrix insectorum* (product known as Sporothrix Es from Biocerto, BR), (2.96) *Stagonospora atriplicis*, (2.97) *Stagonospora heteroderae*, (2.98) *Stagonospora phaseoli*, (2.99) *Suillus granulatus*, (2.100) *Suillus punctatapies*, (2.101) *Talaromyces flavus*, in particular strain V117b (product known as PROTUS® WG from Bayer AG, DE), (2.102) *Trichoderma album* (product known as Bio Zeid® from Organic Biotechnology, EG), (2.103) *Trichoderma asperellum*, in particular strain ICC 012 (CABI CC IMI 392716) (also known as *Trichoderma harzianum* ICC012), or strain SKT-1 (product known as ECO-HOPE ® from Kumiai Chemical Industry) or strain T34 (product known as T34 Biocontrol from Bioncontrol Technologies, ES) or isolate SF04 (URM-5911) or strain TV1 (MUCL 43093) (also known as *Trichoderma viride* TV1) or strain T11 (CECT 20178) (also known as *Trichoderma viride* T25), (2.104) *Trichoderma atroviride*, in particular strain CNCM 1-1237 (product known as Esquive® WP from Agrauxine, FR,) or the strains NMI No. V08/002387, NMI No. V08/002388, NMI No. V08/002389, NMI No. V08/002390 (patent application US 2011/0009260) or strain ATCC 20476 (IMI 206040) or strain T11 (IM1352941/CECT20498) or strain LC52 (products known as Tenet® or Sentinel® from Agrimm Technologies, NZ), or strain SC1 from Bayer AG, DE, or the strains SKT-1 (FERM P-16510), SKT-2 (FERM P-16511) and SKT-3 (FERM P-17021), (2.105) *Trichoderma gamsii* (formerly *T. viride*), in particular strain ICC080 (IMI CC 392151 CABI) (product known as Bioderma), (2.106) *Trichoderma hannatum*, in particular strain TH382 (product known as Incept from Syngenta), (2.107) *Trichoderma harzianum*, in particular *T. harzianum rifai* T39 (product known as Trichodex® from Makhteshim, US), or *T. harzianum rifai* strain KRL-AG2 (strain T-22,/ATCC 208479) (products known as PLANTSHIELD T-22G, Rootshield® and TurfShield from BioWorks, US), or strain KD (products known as Trichoplus from Biological Control Products, SA, or Eco-T from Plant Health Products, SZ), or strain ITEM 908 (CBS 118749), or strain TH 35 (formerly known as *Trichoderma lignorum*), (product known as Root Pro from Mycontrol), or strain DB 103 (product known as T-Gro from Dagutat Biolab), or strain TSTh20 (Patent Deposit Designation number PTA-0317), or strain 1295-22, (2.108) *Trichoderma koningii*, (2.109) *Trichoderma lignorum*, in particular strain TL-0601 (product known as Mycotric from Futureco Bioscience, ES), (2.110) *Trichoderma polysporum*, in particular strain IMI 206039/ATCC 20475, (2.111) *Trichoderma saturnisporium*, in particular strain PBP-TH-001 from Bayer AG, DE, (2.112) *Trichoderma stromaticum* (product known as TRICOVAB® from Ceclap, BR), (2.113) *Trichoderma virens* (also known as *Gliocladium virens*), in particular strain GL-21 (product known as SoilGard from Certis, US) or strain G41, (2.114) *Trichoderma viride*, in particular strain TV1, (2.115) *Tsukamurella paurometabola*, in particular strain C-924 (product known as HeberNem®), (2.116) *Ulocladium oudemansii*, in particular strain HRU3 (product known as Botry-Zen® from Botry-Zen Ltd, NZ), (2.117) *Verticillium alboatrum* (formerly *V. dahliae*), in particular strain WCS850 (CBS 276.92), (2.118) *Verticillium chlamydosporium*, (2.119) *Verticillium dahlia* and (2.120) *Zoophtora radicans*, wherein said mentioned fungi or yeasts are preferred.

(7) Biological control agents which are summarized under the term "botanical extracts" include but are not limited to:

(7.1) Thymol, extracted e. g. from thyme (*Thymus vulgaris*), (7.2) Neem tree (*Azadirachta indica*) oil, and therein Azadirachtin, (7.3) Pyrethrum, an extract made from the dried flower heads of different species of the genus *Tanacetum*, and therein Pyrethrins (the active components of the extract), (7.4) extract of *Cassia nigricans*, (7.5) wood extract of *Quassia amara* (bitterwood), (product known as Quassan from Andermatt Biocontrol AG), (7.6) Rotenon, an extract from the roots and stems of several tropical and subtropical plant species, especially those belonging to the genera *Lonchocarpus* and *Derris*, (7.7) extract of *Allium sativum* (garlic), (7.8) *Quillaja* extract, made from the concentrated purified extract of the outer cambium layer of the *Quillaja Saponaria Molina* tree, (7.9) Sabadilla (Sabadilla=*Schoenocaulon officinale*) seeds, in particular Veratrin (extracted from the seeds), (7.10) *Ryania*, an extract made from the ground stems of *Ryania speciosa*, in particular Ryanodine (the active component of the extract), (7.11) extract of *Viscum album* (mistletoe), (7.12) extract of *Tanacetum vulgare* (tansy), (7.13) extract of *Artemisia absinthium* (wormwood), (7.14) extract of *Urtica dioica* (stinging nettle), (7.15) extract of *Symphytum officinale* (common comfrey), (7.16) extract of *Tropaeulum majus* (monks cress), (7.17) leaves and bark of *Quercus* (oak tree) (7.18) Yellow mustard powder, (7.19) oil of the seeds of *Chenopodium anthelminticum* (wormseed goosefoot), (7.20) dried leaves of *Dryopteris filix-mas* (male fern), (7.21) bark of *Celastrus angulatus* (chinese bittersweet), (7.22) extract of *Equisetum arvense* (field horsetail), (7.23) Chitin (7.24) natural extracts or simulated blend of *Chenopodium ambrosioides* (wormseed), (product known as Requiem® from Bayer AG) which contains a mixture of three terpenes, i.e. α-terpinene (around 10%), p-cymene (around 3.75%) and limonene (around 3%) as pesticidally active ingredients; it is disclosed in US 2010/0316738 corresponding to WO 2010/144919), (7.25) Saponins of *Chenopodium quinoa* (quinoa goosefoot), (product known as Heads Up), (7.26) Maltodextrin (product known as Majestik from Certis Europe), (7.27) orange oil (product known as PREY-AM from Oro Agri B.V.), sesame oil (product known as Dragon-fire-CCP, U.S. Pat. No. 6,599,539), wherein said mentioned botanical extracts are preferred.

All mixing partners of group II can, if their functional groups enable this, optionally form salts with suitable bases or acids. All mixing partners of group II can include tautomeric forms, where applicable.

The active compounds of group II which are specified herein by their "common name" are known and described inter alia in "The Pesticide Manual", 16th edition, The British Crop Protection Council and the Royal Soc. of Chemistry, 2012 and the literature cited therein or can be searched in the internet (e.g. http://www.alanwood.netipesticides). Particularly, reference shall be made to said Manual or website in order to further specify such a mixing partner of group II, e.g. to provide its chemical structure, IUPAC name or its pesticidal activity. Further information about such a mixing partner of group II will be provided as well, in particular it's composition in case that the mixing partner of group II is itself a mixture, e.g. a mixture of enantiomers.

For example, from the data sheet for compound (II-1) "Methiocarb" (http://www.alanwood.net/pesticides/methiocarb.html) it becomes evident that "Methiocarb" is 4-methylthio-3,5-xylyl methylcarbamate (IUPAC), has the CAS Registration No. 2032-65-7 and possesses acaricidal and insecticidal activity.

If, e.g. within this description, the common name of an active compound is used, this in each case encompasses all common derivatives, such as the esters and salts, and isomers, especially optical isomers, especially the commercial form or forms. If an ester or salt is referred to by the common name, this also refers in each case to all other common derivatives, such as other esters and salts, the free acids and neutral compounds, and isomers, especially optical isomers, especially the commercial form or forms. The chemical compound names mentioned refer to at least one of the compounds encompassed by the common name, frequently a preferred compound.

Methods and Uses

The invention also relates to methods for controlling animal or microbial pests, in which active compound combinations according to the invention are allowed to act on the animal or microbial pests and/or their habitat. Preferably, the animal pest is an insect or arachnid or acarid pest. Such control of the animal or microbial pests is preferably conducted in agriculture and forestry, and in material protection. Preferably excluded herefrom are methods for the surgical or therapeutic treatment of the human or animal body and diagnostic methods carried out on the human or animal body.

The invention also relates to the use of active compound combinations according to the invention as pesticidal combinations, in particular crop protection agents. In the context of the present application, the term "pesticide" in each case also always comprises the term "crop protection agent".

The active compound combinations according to the invention are preferably suitable for controlling animal and microbial pests.

The active compound combinations according to the invention are particularly preferably suitable for controlling animal pests, especially insect or arachnid or acarid pests.

The active compound combinations according to the invention are particularly preferably suitable for controlling microbial pests.

The active compound combinations according to the invention are particularly preferably suitable for controlling nematodes.

Preferably excluded from such uses are uses for the surgical or therapeutic treatment of the human or animal body and diagnostic methods carried out on the human or animal body.

The active compound combinations according to the invention are particularly preferably used as plant-strengthening agents.

If appropriate, the active compound combinations according to the invention can, at certain concentrations or application rates, also be used as herbicides, safeners, growth regulators or agents to improve plant properties, or as microbicides, for example as fungicides, antimycotics, bactericides, viricides (including agents against viroids) or as agents against MLO (Mycoplasma-like organisms) and RLO (Rickettsia-like organisms). If appropriate, they can also be employed as intermediates or precursors for the synthesis of other active compound compositions.

The invention also relates to a process for preparing a crop protection agent, characterized in that an active compound combination according to the invention is mixed with extenders and/or surfactants.

The invention also relates to the use of an active compound combination according to the invention for treating plants or parts thereof selected from the group consisting of citrus, pome fruits, stone fruits, tropical fruits, nuts, berries, vegetables, cotton, soybean, grape, tea, coffee, maize, rice and ornamentals.

The person skilled in the art is aware that the terms "a" or "an", as used in the present application, may, depending on the situation, mean "one (1)" "one (1) or more" or "at least one (1)". Generally, the term refers to the meaning of "one (1) or more" or "at least one (1)". However, in one embodiment, the term "a" refers exclusively to "one (1)".

In the context of the present invention, "control of pests" means a reduction in infestation by harmful pests, compared with the untreated plant measured as pesticidal efficacy, preferably a reduction by 25-50%, compared with the untreated plant (100%), more preferably a reduction by 40-79%, compared with the untreated plant (100%); even more preferably, the infection by pests is entirely suppressed (by 70-100%). The control may be curative, i.e. for treatment of already infected plants, or protective, for protection of plants which have not yet been infected.

In the context of the present invention, "control of microbial pests" means a reduction in infestation by harmful microorganisms, compared with the untreated plant measured as fungicidal efficacy, preferably a reduction by 25-50%, compared with the untreated plant (100%), more preferably a reduction by 40-79%, compared with the untreated plant (100%); even more preferably, the infection by harmful microorganisms is entirely suppressed (by 70-100%). The control may be curative, i.e. for treatment of already infected plants, or protective, for protection of plants which have not yet been infected.

Mites are arthropods belonging to the subclass Acari (also known as Acarina) of the class Arachnida. Bananas and plantains belong to the genera *Musa* in the family Musaceae.

Citrus is a common term and genus (Citrus) of flowering plants in the rue family, Rutaceae. The term Citrus includes orange (*C. sinensis*), lemon (*C. limon*), grapefruit (*C. paradisi*), and lime (various, mostly *C. aurantifolia,* the key lime).

Pome is a common term for fruits produced by flowering plants in the subtribe Malinae of the family Rosaceae and for plants producing these fruits. A pome is an accessory fruit composed of one or more carpels surrounded by accessory tissue. Examples of plants that produce fruit classified as a pome are apple, loquat, pear, *Pyracantha,* and quince.

Vegetable as used herein refers to an edible plant or its part selected from the list consisting of flower bud vegetable such as broccoli, cauliflower, globe artichokes and capers; leaf vegetable such as kale, spinach (*Spinacia oleracea*), arugula (*Eruca sativa*), and lettuce (*Lactuca sativa*); stem vegetable such as kohlrabi; stem shoot vegetable such as asparagus, bamboo shoots, potatoes (*Solanum tuberosum* L) and sweet potatoes (*Ipomoea batatas*); root vegetable such as carrots (*Daucus carota*), parsnips (*Pastinaca sativa*), beets (*Beta vulgaris*), and radishes (*Raphanus sativus*); bulb vegetable such as onion, garlic and shallots of genus *Allium*; tomato (*Solanum lycopersicum*), cucumber (*Cucumis sativus*), zucchini, squash and pumpkin of genus species *Cucurbita pepo,* pepper (of family Solanaceae), eggplant; beans (*Phaseolus vulgaris*), and pea (*Pisum sativum*).

Stone fruit are all species of the *Prunus* genus. Examples of plants that produce fruit classified as a stone fruit are e.g. peaches, nectarines, plums, apricots, and cherries. Subtropical and tropical fruit are fruit produced by plants native to the geographical and climatic region of the subtropics or tropics. Examples of plants that produce fruit classified as a subtropical or tropical fruit are e.g avocado, banana, cherimoya, date, dragon fruit, durian, fig, guava, jackfruit, kiwi, lychee, mango, mangosteen, passion fruit, papaya, pineapple, persimmon, pomegranate, rambutan and star fruit. Nuts are referring to any hard-walled, edible kernel such as e.g. almonds, Brazil nuts, cashews, hazelnuts, macadamias, peanuts, pecans, pine nuts, pistachios and walnuts.

Berries are any small edible fruit usually juicy, round, brightly coloured, sweet or sour, and do not have a stone or pit, although seeds may be present as e.g. blackberry, blueberry, cranberry, currant, elderberry, gooseberry, grape, raspberry, strawberry.

Ornamentals are plants grown for decorative purposes in gardens and landscape design, as houseplants, for cut flowers and specimen display, e.g. roses, chrysanthemums, tulips, etc.

An individual embodiment refers to an active compound combination according to the invention, wherein the compound of group (II) is selected from the group consisting of (a) Insecticide Groups (1), (12), (20), (21) and (30).

Another individual embodiment refers to an active compound combination according to the invention, wherein the compound of group (II) is selected from the group consisting of (b) compounds of formula (IIa) or (IIb).

Another individual embodiment refers to an active compound combination according to the invention, wherein the compound of group (II) is selected from the group consisting of (c) Biological Control Agent (BCA) Groups (1), (2) and (7).

The compound of the formula (I) has a chiral sulphoxide group so that it forms two enantiomers having (+) or (−) specific rotation:

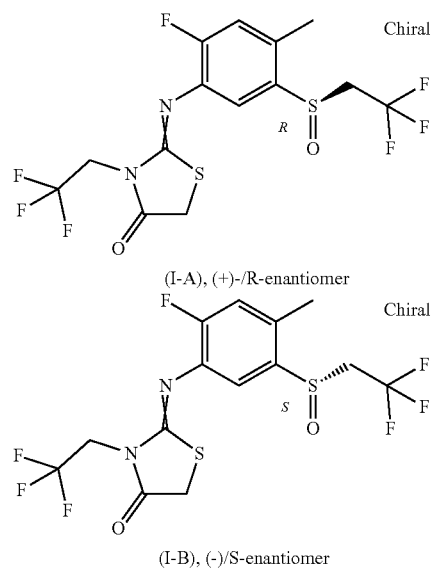

(I-A), (+)-/R-enantiomer (I-B), (−)/S-enantiomer

For the two enantiomers of the compound of formula (I) it is to be understood that the (+) enantiomer is the (R)-enantiomer and the (S)-enantiomer is the (−) enantiomer, i.e. the compound of formula (I-A) is also to be designated as (R)-enantiomer and the compound of formula (I-B) is also to be designated as (S)-enantiomer.

In the synthesis from achiral starting materials the two enantiomers are formed in equal amounts so that a racemate is present. The separation of the racemate into the individual enantiomers is known from the literature (cf. WO 2013/092350).

Accordingly, the present invention provides active compound combinations comprising the racemate or the (+) or (−) enantiomer of the compound of formula (I) and at least one active compound of group (II). Preferably, the optically active, stereoisomeric forms of the compound of formula (I) and its salts are used according to the invention, especially preferably its (+) enantiomer.

An individual embodiment refers to active compound combinations comprising the racemate or the (+) or (−) enantiomer of the E-isomer of the compound of formula (I) and at least one active compound of group (II). Preferably, the optically active, stereoisomeric forms of the compound of formula (I) and its salts are used according to the invention, especially preferably its (+) enantiomer.

Another individual embodiment refers to active compound combinations comprising the racemate or the (+) or (−) enantiomer of the Z-isomer of the compound of formula (I) and at least one active compound of group (II). Preferably, the optically active, stereoisomeric forms of the compound of formula (I) and its salts are used according to the invention, especially preferably its (+) enantiomer.

Another individual embodiment refers to an active compound combination according to the invention, wherein the compound of formula (I) is present in form of its racemate.

Another individual embodiment refers to an active compound combination according to the invention, wherein the E-isomer of the compound of formula (I) is present in form of its racemate.

Another individual embodiment refers to an active compound combination according to the invention, wherein the Z-isomer of the compound of formula (I) is present in form of its racemate.

Another individual embodiment refers to an active compound combination according to the invention, wherein the compound of formula (I) is present in form of its (+) enantiomer, or is present in form of a mixture of its (+) enantiomer and its (−) enantiomer which is enriched in the (+) enantiomer, preferably in a mixing ratio of at least 60:40 and increasingly preferably of at least 70:30, 75:25, 80:20, 85:15 und 90:10 (+):(−) enantiomer.

Another individual embodiment refers to an active compound combination according to the invention, wherein the E-isomer of the compound of formula (I) is present in form of its (+) enantiomer, or is present in form of a mixture of its (+) enantiomer and its (−) enantiomer which is enriched in the (+) enantiomer, preferably in a mixing ratio of at least 60:40 and increasingly preferably of at least 70:30, 75:25, 80:20, 85:15 und 90:10 (+):(−) enantiomer.

Another individual embodiment refers to an active compound combination according to the invention, wherein the Z-isomer of the compound of formula (I) is present in form of its (+) enantiomer, or is present in form of a mixture of its (+) enantiomer and its (−) enantiomer which is enriched in the (+) enantiomer, preferably in a mixing ratio of at least 60:40 and increasingly preferably of at least 70:30, 75:25, 80:20, 85:15 und 90:10 (+):(−) enantiomer.

Reference is also made to an active compound combination, wherein the compound of formula (I) is present in form of its (−) enantiomer, or is present in form of a mixture of its (−) enantiomer and its (+) enantiomer which is enriched in the (−) enantiomer, preferably in a mixing ratio of at least 60:40 and increasingly preferably of at least 70:30, 75:25, 80:20, 85:15 und 90:10 (−):(+) enantiomer.

Reference is also made to an active compound combination, wherein the E-isomer of the compound of formula (I) is present in form of its (−) enantiomer, or is present in form of a mixture of its (−) enantiomer and its (+) enantiomer which is enriched in the (−) enantiomer, preferably in a mixing ratio of at least 60:40 and increasingly preferably of at least 70:30, 75:25, 80:20, 85:15 und 90:10 (−):(+) enantiomer.

Reference is also made to an active compound combination, wherein the Z-isomer of the compound of formula (I) is present in form of its (−) enantiomer, or is present in form of a mixture of its (−) enantiomer and its (+) enantiomer which is enriched in the (−) enantiomer, preferably in a mixing ratio of at least 60:40 and increasingly preferably of at least 70:30, 75:25, 80:20, 85:15 and 90:10 (−):(+) enantiomer.

In the following, more preferred compounds of group (II) are described:

(a) More preferred mixing partners from the Insecticide Groups (IRAC classification groups) (1), (12), (20), (21) and (30) are:

From Insecticide Group (1) Acetylcholinesterase (AChE) inhibitors, for example carbamates, (II-1) Methiocarb, (II-2) Benfuracarb, (II-3) Carbaryl, (II-4) Carbofuran, (II-5) Carbosulfan, (II-6) Methomyl, (II-7) Oxamyl, (II-8) Thiodicarb, (II-9) Aldicarb, and organophosphates, (II-10) Acephate, (II-11) Chlorpyrifos, (II-12) Dimethoate, (II-13) Ethoprophos, (II-14) Fenamiphos, (II-15) Phorate, (II-16) Profenofos.

From Insecticide Group (12) Inhibitors of mitochondrial ATP synthase, for example ATP disruptors, (II-17) diafenthiuron.

From Insecticide Group (20) Mitochondrial complex III electron transport inhibitors, (II-18) acequinocyl.

From Insecticide Group (21) Mitochondrial complex I electron transport inhibitors, for example from the group of the METI acaricides, (II-19) fenazaquin, (II-20) fenpyroximate, (II-21) pyridaben, (II-22) tebufenpyrad, (II-23) tolfenpyrad, From Insecticide Group (30) further active compounds selected from (II-24) Fluopyram, (II-25) Fluazaindolizine, (II-26) Fluensulfone, (II-27) Tioxazafen, (II-28) Bifenazate, (II-29) Afidopyropen, (II-30) Pyrifluquinazon.

(II-31) A formulation comprising the three terpenes α-terpinene, p-cymene and limonene in a total amount of 15-18%, preferably 16.75%, (w/w) terpenes.

Especially preferred mixing partners from the Insecticide Groups (IRAC classification groups) (1), (12), (20), (21) and (30) are:

(II-1) methiocarb, (II-17) diafenthiuron, (II-18) acequinocyl, (II-19) fenazaquin, (II-20) fenpyroximate, (II-21) pyridaben, (II-22) tebufenpyrad, (II-24) fluopyram, (II-25) fluazaindolizine, (II-26) fluensulfone, (II-27) tioxazafen, (II-28) bifenazate and (II-31) a formulation comprising the three terpenes α-terpinene, p-cymene and limonene in a total amount of 15-18%, preferably 16.75%, (w/w) terpenes.

One preferred embodiment refers to combinations comprising a compound of formula (I) and a compound of group (II) selected from the mixing partners from the Insecticide Groups (IRAC classification groups) (1), (12), (20), (21) and (30) defined above as being preferred.

One preferred embodiment refers to combinations comprising a compound of formula (I) and a compound of group (II) selected from the mixing partners from the Insecticide Groups (IRAC classification groups) (1), (12), (20), (21) and (30) defined above as being more preferred.

Another preferred embodiment refers to combinations comprising a compound of formula (I) and a compound of group (II) selected from the mixing partners from the Insecticide Groups (IRAC classification groups) (1), (12), (20), (21) and (30) defined above as being especially preferred.

Another preferred embodiment refers to combinations comprising a compound of formula (I) and (II-1) methiocarb.

Another preferred embodiment refers to combinations comprising a compound of formula (I) and (II-17) diafenthiuron.

Another preferred embodiment refers to combinations comprising a compound of formula (I) and (II-18) acequinocyl.

Another preferred embodiment refers to combinations comprising a compound of formula (I) and (II-19) fenazaquin.

Another preferred embodiment refers to combinations comprising a compound of formula (I) and (II-20) fenpyroximate.

Another preferred embodiment refers to combinations comprising a compound of formula (I) and (II-21) pyridaben.

Another preferred embodiment refers to combinations comprising a compound of formula (I) and (II-22) tebufenpyrad.

Another preferred embodiment refers to combinations comprising a compound of formula (I) and (II-24) fluopyram.

Another preferred embodiment refers to combinations comprising a compound of formula (I) and (II-25) fluazaindolizine.

Another preferred embodiment refers to combinations comprising a compound of formula (I) and (II-26) fluensulfone.

Another preferred embodiment refers to combinations comprising a compound of formula (I) and (II-27) tioxazafen.

Another preferred embodiment refers to combinations comprising a compound of formula (I) and (II-28) bifenazate.

Another preferred embodiment refers to combinations comprising a compound of formula (I) and (II-31) a formulation comprising the three terpenes α-terpinene, p-cymene and limonene in a total amount of 15-18%, preferably 16.75%, (w/w) terpenes.

(b) More preferred mixing partners from the group consisting of (b) compounds of formula (IIa) or (IIb) are:

Compound of formula (IIa), compound of formula (IIb).

Especially preferred mixing partners from the group consisting of (b) compounds of formula (IIa) or (IIb) are:

Compound of formula (IIa), compound of formula (IIb).

Another preferred embodiment refers to combinations comprising a compound of formula (I) and a compound of formula (IIa).

Another preferred embodiment refers to combinations comprising a compound of formula (I) and a compound of formula (IIb).

(c) More preferred mixing partners from the Biological Control Agent (BCA) Groups (1), (2) and (7) are:

(1.60) *Bacillus thuringiensis*

(1.24) *Bacillus amyloliquefaciens*

(1.34) *Bacillus firmus* (including but not limited to strain CNCM 1-1582 which is preferred, for example a product known as BioNeem or Votivo)

(1.49) *Bacillus mycoides*

(1.58) *Bacillus subtilis*

(1.66) *Chromobacterium subtsugae*

(1.81) *Pasteuria nishizawae*

(1.110) *Streptomyces galbus*

(1.114) *Streptomyces microflavus* strain AQ6121

(1.114) *Streptomyces microflavus* strain M AQ6121.002)

(2.9) *Beauveria bassiana*

(2.54) *Metarhizium anisopliae* (including but not limited to strain F52 (DSM3884/ATCC 90448) which is preferred)

(2.56) *Metschnikowia fructicola*

(2.64) *Muscodor albus*

(2.72) *Paecilomyces fumosoroseus*

(2.73) *Paecilomyces lilacinus* (including but not limited to strain 251 (AGAL 89/030550) which is preferred, for example a product which is known as BioAct®)

(7.1) Thymol (7.2) Azadirachtin (for example Neem tree oil)

(7.24) natural extract or simulated blend of *Chenopodium ambrosioides* (product known as Requiem®, which contains a mixture of three terpenes, i.e. α-terpinene, p-cymene and limonene).

Especially preferred mixing partners from the Biological Control Agent (BCA) Groups (1), (2) and (7) are:

(1.34) *Bacillus firmus* (including but not limited to strain CNCM 1-1582 which is preferred, for example a product known as BioNeem or Votivo)

(2.54) *Metarhizium anisopliae* (including but not limited to strain F52 (DSM3884/ATCC 90448) which is preferred)

(2.73) *Paecilomyces lilacinus* (including but not limited to strain 251 (AGAL 89/030550) which is preferred, for example a product which is known as BioAct®)

(7.24) natural extract or simulated blend of *Chenopodium ambrosioides* (product known as Requiem®, which contains a mixture of three terpenes, i.e. α-terpinene, p-cymene and limonene).

One preferred embodiment refers to combinations comprising a compound of formula (I) and a compound of group (II) selected from the mixing partners from the Biological Control Agent (BCA) Groups (1), (2) and (7) defined above as being preferred.

One preferred embodiment refers to combinations comprising a compound of formula (I) and a compound of group (II) selected from the mixing partners from the Biological Control Agent (BCA) Groups (1), (2) and (7) defined above as being more preferred.

Another preferred embodiment refers to combinations comprising a compound of formula (I) and a compound of group (II) selected from the mixing partners from the Biological Control Agent (BCA) Groups (1), (2) and (7) defined above as being especially preferred.

Another preferred embodiment refers to combinations comprising a compound of formula (I) and (1.34) *Bacillus firmus* (including but not limited to strain CNCM 1-1582 which is preferred, for example a product known as BioNeem or Votivo).

Another preferred embodiment refers to combinations comprising a compound of formula (I) and (2.54) *Metarhizium anisopliae* (including but not limited to strain F52 (DSM3884/ATCC 90448) which is preferred).

Another preferred embodiment refers to combinations comprising a compound of formula (I) and (2.73) *Paecilomyces lilacinus* (including but not limited to strain 251 (AGAL 89/030550) which is preferred, for example a product which is known as BioAct®).

Another preferred embodiment refers to combinations comprising a compound of formula (I) and (7.24) natural extract or simulated blend of *Chenopodium ambrosioides* (product known as Requiem®, which contains a mixture of three terpenes, i.e. α-terpinene, p-cymene and limonene).

Mixing Ratio

The synergistic effect is particularly pronounced when the active compounds in the active compound combinations according to the invention are present in certain weight ratios. However, the weight ratios of the active compounds in the active compound combinations can be varied within a relatively wide range. In general, the combinations according to the invention comprise an active compound (I) and an active compound of group (II) selected from (a) Insecticide Groups (1), (12), (20), (21) and (30) and (b) compounds of formula (IIa) or (IIb) in the following preferred, more preferred and particularly preferred mixing ratios:

Preferred mixing ratio: 125:1 to 1:125 such as 100:1 to 1:100 or 75:1 to 1:75.

More preferred mixing ratio: 50:1 to 1:50 such as 50:1 to 1:15 or 1:15 to 50:1 or even 20:1 to 1:20 or 20:1 to 1:15 or 15:1 to 1:20 or 15:1 to 1:15 or 10:1 to 1:10 or 5:1 to 1:5.

Particularly preferred mixing ratios for some specific combinations of compound of formula (I) and a compound of group (II) are provided in table 1. Thus, each individual active compound combination of a compound of formula (I) and the indicated mixing partner of group (II) in each of the indicated mixing ratios is a preferred embodiment of the invention.

TABLE 1

| Mixing partner of group (II) | Mixing ratios |
| --- | --- |
| (II-1) methiocarb | 25:1 to 1:25 or 20:1 to 1:20 |
| (II-17) diafenthiuron | 10:1 to 1:10 or 5:1 to 1:10 or 1:1 to 1:10 |
| (II-18) acequinocyl | 10:1 to 1:10 or 5:1 to 1:5 or 2:1 to 1:2 |
| (II-19) fenazaquin | 10:1 to 1:10 or 5:1 to 1:5 or 4:1 to 1:4 |
| (II-20) fenpyroximate | 10:1 to 1:10 or 5:1 to 1:5 or 3:1 to 1:3 |
| (II-21) pyridaben | 10:1 to 1:10 or 5:1 to 1:5 or 2:1 to 1:2 or 1:1 |
| (II-22) tebufenpyrad | 10:1 to 1:10 or 5:1 to 1:5 or 2:1 to 1:2 or 1:1 |
| (II-24) fluopyram | 250:1 to 1:10 |
| (II-25) fluazaindolizine | 50:1 to 1:50 or 50:1 to 1:1 or 50:1 to 20:1 |
| (II-26) fluensulfone | 50:1 to 1:50 or 50:1 to 1:10 or 50:1 to 10:1 |
| (II-27) tioxazafen | 10:1 to 1:10 or 8:1 to 1:1 |
| (II-28) bifenazate | 10:1 to 1:10 or 5:1 to 1:5 or 3:1 to 1:3 or 1:3 to 1:5 |
| compound of formula (IIa) | 20:1 to 1:20 or 10:1 to 1:10 or 10:1 to 1:2 |
| compound of formula (IIb) | 50:1 to 1:10 or 50:1 to 1:5 or 50:1 to 1:1.5 |
| (II-31) formulation comprising the three terpenes α-terpinene, p-cymene and limonene in a total amount of 15-18%, preferably 16,75%, (w/w) terpenes | 40:1 to 1:40 or 30:1 to 1:30 or 1:10 to 1:30 |

The mixing ratios are based on weight ratios. The ratio is to be understood as meaning active compound of the formula (I) : an active compound of group (II).

Mixing Ratio BCA

The compounds of the formula (I) and the biological control agent (group II(c)) as defined above of the mixture or composition according to the invention can be combined in any specific ratio between these two mandatory components. A biological control agent is generally provided in form of a carrier such as a solution or powder or suspension comprising the biological control agent (e.g.in form of viable spores or conidia or an extract). In one preferred embodiment, the amount of viable spores or conidia per gramm compound of formula (I) in a mixture or composition according to the invention normally provided in/on a carrier is at least $10^7$ viable spores or conidia/g compound of formula (I), such as between $10^7$ and $10^{14}$ viable spores or conidia/g compound of formula (I), more preferably at least $10^8$ viable spores or conidia/g compound of formula (I), such as between between $10^8$ and $5 \times 10^{13}$ viable spores or conidia/g compound of formula (I), or even more preferably at least $10^9$ viable spores or conidia/g compound of formula (I), such as between $10^9$ and $10^{13}$ viable spores or conidia/g compound of formula (I).

The term "viability" of spores or conidia refers to the ability of spores or conidia to germinate at standard conditions and under sufficient supply of nutritions, water, light and/or further support such as growth media. Viability of spores and conidia can be easily determined by a person skilled in the art, e.g. by counting colonies formed by spores/conidia on a growth medium suitable for species to be tested. In addition, many assays are available in the art to determine viability of spores and/or conidia, e.g., Chen et al (Can. J. Plant Pathol., 24; 230-232 (2002); Paul et al (Biotech. And Bioengeneering, 42; 11-23 (1993); Panahiam et al (International Research Journal of Applied and Basic Science, 3(2); 292-298 (2012) or Laflamme et al (J. of applied Microbiol. 96; 684-692 (2004)).

In one preferred embodiment, wherein the biological control agent is a natural extract or simulated blend, the ratio is measured in view of the amount of biological active agent(s) in the extract or simulated blend. Thus, the ratio of an extract or simulated blend is based on the amount of active ingredient and not on the amount of the whole extract or blend. For example, a weight ratio of 1:1 of a compound according to formula (I) and a biological control agent (II) in form of a natural extract or simulated blend with 16.75% (w/w) active ingredient(s), such as terpenes, refers to a mixture or composition comprising, e.g., 1 g of a compound according to formula (I) and 5.97 g of the natural extract or simulated blend comprising 16.75% active ingredient(s) (biological control agent (II)), i.e. 1 g active ingredient(s) (biological control agent (II)) resulting in a 1:1 mixture in view of a compound of formual (I) and the active ingredient(s) (biological control agent (II)).

Thus, in one preferred embodiment, the mixing ratio in mixtures of a compound of formula (I) and natural extracts or simulated blend of, e.g., *Chenopodium ambrosioides* is 1500:1 to 1:2000. Such as 1:1 to 1:2000 or 1:1 to 1:2000 or 1:1 to 1:1500 or 1:10 to 1:1500 or 1:1 to 1:250 or 1:5 to 1:100 or 1:10 to 1:25. One natural extract or simulated blend of *Chenopodium ambrosioides* is known as Requiem. The active ingredient(s) concentration in Requiem is 16.75% (w/w) terpenes, i.e. a mixture of α-terpinene, p-cymene and limonene. As outlined above, the weight ratio of a compound of formula (I) and active ingredient(s) of Requiem can be calculated by using the concentration of said active ingredients in the natural extract or simulated blend. The skilled person is aware how to calculate the concentration of, e.g., terpenes. Analytical methods are known from, e.g., Goren et al (0939D5075/2003/0900D0687 Verlag der Zeitschrift fur Naturforschung, Tubingen, (2003), http://www.znaturforsch.com); Kimball et al (J. of Chrom. Science, 42; 245-249 (2004), Davidowski, Perkin Elmer for the Better, http://www.perkinelmer.com/Content/application-notes/app_limoneneincitrusrindsbygcms.pdf In another preferred embodiment, the mixing ratio in mixtures or compositions of a compound of formula (I) and fungi (which are, e.g. provided in form of a solution or solid form (e.g. a powder) with viable conidia and/or spores) is between $10^7$ and $10^{14}$ viable spores or conidia/g compound of formula (I), preferably between $10^8$ and $10^{13}$ viable spores or conidia/g compound of formula (I), more preferably between $10^9$ and $10^{13}$ viable spores or conidia/g compound of formula (I), even more preferably between $10^{10}$ and $10^{12}$ viable spores or conidia/g compound of formula (I).

For example, the ratio of viable conidia of *Metarhizium anisopliae* (e.g. Met 52, e.g., with a concentration of $5 \times 10^9$ viable conidia/g solid form carrier) per gr compound of formula (I)) is preferably between $10^8$ and $10^{13}$ viable conidia/g compound of formula (I), more preferably between $10^9$ and $10^{13}$ viable conidia/g compound of formula (I), even more preferably between $10^{10}$ and $10^{12}$ viable conidia/g compound of formula (I) such as between $3\times10^{10}$ and $7\times10^{11}$ viable conidia/g compound of formula (I).

For example, the ratio of viable spores of *Paecilomyces fumosoroseus* (e.g. PreFeRal, for example with a concentration of $2\times10^9$ viable spores/g solution) per gr compound of formula (I)) is preferably between $10^8$ and $10^{13}$ viable spores/g compound of formula (I), more preferably between $10^9$ and $10^{13}$ viable spores/g compound of formula (I), even more preferably between $10^{10}$ and $10^{13}$ viable spores/g compound of formula (I) such as between $10^{11}$ and $3\times10^{12}$ viable spores/g compound of formula (I).

For example, the ratio of viable spores of *Beauveria bassiana* (e.g., Naturalis-L, for example with a concentration of $2.3\times10^7$ viable spores/ml solution) per gr compound of formula (I)) is preferably between $10^8$ and $10^{13}$ viable spores/g compound of formula (I), more preferably between $10^9$ and $10^{13}$ viable spores/g compound of formula (I), even more preferably between $5\times10^9$ and $10^{12}$ viable spores/g compound of formula (I) such as between $5\times10^9$ and $5\times10^{11}$ viable spores/g compound of formula (I).

For example, the ratio of viable spores of *Paecilomyces lilacinus* (e.g., *Paecilomyces lilacinus* strain 251 (BioAct), for example with a concentration of $10^{10}$ viable spores/g carrier) per gr compound of formula (I)) is preferably between $10^8$ and $10^{14}$ viable spores/g compound of formula (I), more preferably between $10^{10}$ and $10^{14}$ viable spores/g compound of formula (I), even more preferably between $5\times10^{11}$ and $5\times10^{13}$ viable spores/g compound of formula (I) such as between $10^{12}$ and $5\times10^{13}$ viable spores/g compound of formula (I).

In another preferred embodiment, the mixing ratio in mixtures or compositions of a compound of formula (I) and bacteria (which are, e.g. provided in form of a solution or solid form (e.g. a powder) with viable spores) is between $10^7$ and $10^{14}$ viable spores/g compound of formula (I), preferably between $10^8$ and $10^{13}$ viable spores/g compound of formula (I), more preferably between $10^9$ and $10^{13}$ viable spores/g compound of formula (I), even more preferably between $10^{10}$ and $10^{12}$ viable spores/g compound of formula (I).

For example, the ratio of viable spores of *Bacillus thuringiensis* (e.g., *B. thuringiensis* subsp. *aizawai* ABTS-1857 (XenTari), for example with a concentration of $1.5\times10^7$ viable spores/g carrier) per gr compound of formula (I) is preferably between $10^8$ and $10^{13}$ viable spores/g compound of formula (I), more preferably between $10^8$ and $10^{11}$ viable spores/g compound of formula (I), even more preferably between $10^9$ and $10^{11}$ viable spores/g compound of formula (I) such as between $10^9$ and $5\times10^{10}$ viable spores/g compound of formula (I).

For example, the ratio of viable spores of *Bacillus firmus* (including but not limited to strain CNCM I-1582, for example with a concentration of $1.5\times10^7$ viable spores/g carrier) per gr compound of formula (I) is preferably between $10^8$ and $10^{12}$ viable spores/g compound of formula (I), more preferably between $10^8$ and $10^{11}$ viable spores/g compound of formula (I), even more preferably between $10^9$ and $10^{11}$ viable spores/g compound of formula (I) such as between $10^9$ and $5\times10^{10}$ viable spores/g compound of formula (I).

Some particularly preferred mixing ratios for some specific combinations of the compound of formula (I) and a mixing partner of group (II(c)) are provided in table 2, wherein the mixing partner of group (II(c)) is used with a concentration/carrier or solution as described above. Thus, each individual active compound combination of a compound of formula (I) and the indicated mixing partner of group (II(c)) in each of the indicated mixing ratios is a preferred embodiment of the invention.

TABLE 2

| Mixing partner of group (II) | Mixing ratios |
| --- | --- |
| (1.34) *Bacillus firmus* I-1582 | 1:1 to 1:50 or 1:10 to 1:30 |
| (2.54) *Metarhizium anisopliae* strain F52 | 5:1 to 1:10 or 1:1 to 1:10 |
| (2.73) *Paecilomyces lilacinus* strain 251 | 1:1 to 1:50 or 1:10 to 1:30 |
| (7.24) natural extract or simulated blend of *Chenopodium ambrosioides* (product known as Requiem ®, which contains a mixture of three terpenes, i.e. α-terpinene, p-cymene and limonene). | 10:1 to 1:30 or 1:1 to 1:30 or 1:10 to 1:30 |

Additional Mixing Partners

Furthermore, the active compound combinations according to the invention and, in particular, the active compound combinations listed in tables 1 and 2, may contain one or more further active substances selected from a fungicide, an insecticide or a biological control agent, i.e. at least one further fungicidally or insecticidally active additive. Preferably, such further active additive is selected from groups (1) to (30) mentioned below. The active compounds identified here by their common names are known and are described, for example, in the pesticide handbook ("The Pesticide Manual" 16th Ed., British Crop Protection Council 2012) or can be found on the Internet (e.g. http://www.alanwood.net/pesticides). The classification is based on the current IRAC Mode of Action Classification Scheme at the time of filing of this patent application.

(1) Acetylcholinesterase (AChE) inhibitors, preferably carbamates selected from alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb, or organophosphates selected from acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel blockers, preferably cyclodiene-organochlorines selected from chlordane and endosulfan or phenylpyrazoles (fiproles), for example ethiprole and fipronil.

(3) Sodium channel modulators, preferably pyrethroids selected from acrinathrin, allethrin, d-cis-trans allethrin, d-trans allethrin, bifenthrin, bioallethrin, bioallethrin s-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomer], deltamethrin, empenthrin [(EZ)-

(1R)-isomer], esfenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans-isomer], prallethrin, pyrethrins (pyrethrum), resmethrin, silafluofen, tefluthrin, tetramethrin, tetramethrin [(1R)-isomer)], tralomethrin and transfluthrin or DDT or methoxychlor.

(4) Nicotinic acetylcholine receptor (nAChR) competitive modulators, preferably neonicotinoids selected from acetamiprid, clothianidin, dinotefuran, imidacloprid, nitenpyram, thiacloprid and thiamethoxam or nicotine or sulfoxaflor or flupyradifurone.

(5) Nicotinic acetylcholine receptor (nAChR) allosteric modulators, preferably spinosyns selected from spinetoram and spinosad.

(6) Glutamate-gated chloride channel (GluCl) allosteric modulators, preferably avermectins/milbemycins selected from abamectin, emamectin benzoate, lepimectin and milbemectin.

(7) Juvenile hormone mimics, preferably juvenile hormone analogues selected from hydroprene, kinoprene and methoprene, or fenoxycarb or pyriproxyfen.

(8) Miscellaneous non-specific (multi-site) inhibitors, preferably alkyl halides selected from methyl bromide and other alkyl halides, or chloropicrine or sulphuryl fluoride or borax or tartar emetic or methyl isocyanate generators selected from diazomet and metam.

(9) Chordotonal organ TRPV channel modulators selected from pymetrozine and pyrifluquinazone.

(10) Mite growth inhibitors selected from clofentezine, hexythiazox, diflovidazin and etoxazole.

(11) Microbial disruptors of the insect gut membrane selected from *Bacillus thuringiensis* subspecies *israelensis*, *Bacillus sphaericus*, *Bacillus thuringiensis* subspecies *aizawai*, *Bacillus thuringiensis* subspecies *kurstaki*, *Bacillus thuringiensis* subspecies *tenebrionis*, and *B.t.* plant proteins selected from Cry1Ab, Cry1Ac, Cry1Fa, Cry1A.105, Cry2Ab, Vip3A, mCry3A, Cry3Ab, Cry3Bb and Cry34Ab1/35Ab1.

(12) Inhibitors of mitochondrial ATP synthase, preferably ATP disruptors selected from diafenthiuron, or organotin compounds selected from azocyclotin, cyhexatin and fenbutatin oxide, or propargite or tetradifon.

(13) Uncouplers of oxidative phosphorylation via disruption of the proton gradient selected from chlorfenapyr, DNOC and sulfluramid.

(14) Nicotinic acetylcholine receptor channel blockers selected from bensultap, cartap hydrochloride, thiocylam and thiosultap-sodium.

(15) Inhibitors of chitin biosynthesis, type 0, selected from bistrifluron, chlorfluazuron, diflubenzuron, flucycloxuron, flufenoxuron, hexaflumuron, lufenuron, novaluron, noviflumuron, teflubenzuron and triflumuron.

(16) Inhibitors of chitin biosynthesis, type 1 selected from buprofezin.

(17) Moulting disruptor (in particular for Diptera, i.e. dipterans) selected from cyromazine.

(18) Ecdysone receptor agonists selected from chromafenozide, halofenozide, methoxyfenozide and tebufenozide.

(19) Octopamine receptor agonists selected from amitraz.

(20) Mitochondrial complex III electron transport inhibitors selected from hydramethylnone, acequinocyl and fluacrypyrim.

(21) Mitochondrial complex I electron transport inhibitors, preferably METI acaricides selected from fenazaquin, fenpyroximate, pyrimidifen, pyridaben, tebufenpyrad and tolfenpyrad, or rotenone (Derris).

(22) Voltage-dependent sodium channel blockers selected from indoxacarb and metaflumizone.

(23) Inhibitors of acetyl CoA carboxylase, preferably tetronic and tetramic acid derivatives selected from spirodiclofen, spiromesifen and spirotetramat.

(24) Mitochondrial complex IV electron transport inhibitors, preferably phosphines selected from aluminium phosphide, calcium phosphide, phosphine and zinc phosphide, or cyanides selected from calcium cyanide, potassium cyanide and sodium cyanide.

(25) Mitochondrial complex II electron transport inhibitors, preferably beta-ketonitrile derivatives selected from cyenopyrafen and cyflumetofen, and carboxanilides selected from pyflubumide.

(28) Ryanodine receptor modulators, preferably diamides selected from chlorantraniliprole, cyantraniliprole and flubendiamide.

(29) Chordotonal organ Modulators (with undefined target site) selected from flonicamid.

(30) further active compounds selected from Afidopyropen, Afoxolaner, Azadirachtin, Benclothiaz, Benzoximate, Bifenazate, Broflanilide, Bromopropylate, Chinomethionat, Chloroprallethrin, Cryolite, Cyclaniliprole, Cycloxaprid, Cyhalodiamide, Dicloromezotiaz, Dicofol, epsilon-Metofluthrin, epsilon-Momfluthrin, Flometoquin, Fluazaindolizine, Fluensulfone, Flufenerim, Flufenoxystrobin, Flufiprole, Fluhexafon, Fluopyram, Fluralaner, Fluxametamide, Fufenozide, Guadipyr, Heptafluthrin, Imidaclothiz, Iprodione, kappa-Bifenthrin, kappa-Tefluthrin, Lotilaner, Meperfluthrin, Paichongding, Pyridalyl, Pyrifluquinazon, Pyriminostrobin, Spirobudiclofen, Tetramethylfluthrin, Tetraniliprole, Tetrachlorantraniliprole, Tigolaner, Tioxazafen, Thiofluoximate, Triflumezopyrim and iodomethane; furthermore preparations based on *Bacillus firmus* (I-1582, BioNeem, Votivo), and also the following compounds: 1-{2-fluoro-4-methyl-5-[(2,2,2-trifluoroethyl)sulphinyl]phenyl}-3-(trifluoromethyl)-1H-1,2,4-triazole-5-amine (known from WO2006/043635) (CAS 885026-50-6), {1'-[(2E)-3-(4-chlorophenyl)prop-2-en-1-yl]-5-fluorospiro[indol-3,4'-piperidin]-1(2H)-yl}(2-chloropyridin-4-yl)methanone (known from WO2003/106457) (CAS 637360-23-7), 2-chloro-N-[2-{1-[(2E)-3-(4-chlorophenyl)prop-2-en-1-yl]piperidin-4-yl}-4-(trifluoromethyl)phenyl]isonicotinamide (known from WO2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010052161) (CAS 1225292-17-0), 3-(4-chloro-2,6-dimethylphenyl)-8-methoxy-2-oxo-1,8-diazaspiro[4.5]dec-3-en-4-yl ethyl carbonate (known from EP2647626) (CAS 1440516-42-6), 4-(but-2-yn-1-yloxy)-6-(3,5-dimethylpiperidin-1-yl)-5-fluoropyrimidine (known from WO2004/099160) (CAS 792914-58-0), PF1364 (known from JP2010/018586) (CAS 1204776-60-2), N-[(2E)-1-[(6-chloropyridin-3-yl)methyl]pyridin-2(1H)-ylidene]-2,2,2-trifluoroacetamide (known from WO2012/029672) (CAS 1363400-41-2), (3E)-3-[1-[(6-chloro-3-pyridyl)methyl]-2-pyridylidene]-1,1,1-trifluoro-propan-2-one (known from WO2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)-benzamide, 4-[5-(3,5-dichlorophenyl)-4,5-dihydro -5-(trifluoromethyl)-3-isoxazolyl]-2-methyl-N-

(trans-1-oxido-3-thietanyl)-benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]-propanamide, (+)-N-[3-chloro-1-(3-pyridinyl)-1H-pyrazol-4-yl]-N-ethyl-3-[(3,3,3-trifluoropropyl)sulfinyl]-prop anamide and (−)-N-[3-chloro-1-(3-pyridinyl)-1H-pyrazol-4-yl]-N-ethyl-3-[(3,3,3-trifluoropropyl)sulfinyl]-propanamide (known from WO 2013/162715 A2, WO 2013/162716 A2, US 2014/0213448 A1) (CAS 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide, (Liudaibenjiaxuanan, known from CN 103109816 A) (CAS 1232543-85-9) ; N-[4-chloro-2-[[(1,1-dimethylethyl)amino]carbonyl]-6-methylphenyl]-1-(3-chloro-2-pyridinyl)-3-(fluoromethoxy)-1H-Pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro -2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy]phenoxy]propoxy]-2-methoxy-6-(trifluoromethyl)-pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]-hydrazinecarboxamide (known from CN 101715774 A) (CAS 1232543-85-9); 3-(2,2-dichloroethenyl)-2,2-dimethyl-4-(1H-benzimidazol-2-yl)phenyl-cyclopropanecarboxylic acid ester (known from CN 103524422 A) (CAS 1542271-46-4); (4 aS)-7-chloro-2,5-dihydro-2-[[methoxycarbonyl)[4-[(trifluoromethyl)thio]phenyl]amino]carbonyl]-indeno[1,2-e][1,3,4]oxadiazine-4a(3H)-carboxylic acid methyl ester (known from CN 102391261 A) (CAS 1370358-69-2); 6-deoxy-3-O-ethyl-2,4-di-O-methyl-, 1-[N-[4-[1-[4-(1,1,2,2,2-pentafluoroethoxy)phenyl]-1H-1,2,4-triazol-3-yl]phenyl]carbamate]-α-L-mannopyranose (known from US 2014/0275503 A1) (CAS 1181213-14-8); 8-(2-cyclopropylmethoxy-4-trifluoromethyl-phenoxy)-3-(6-trifluoromethyl-pyridazin-3-yl)-3-azabicyclo[3.2.1]octane (CAS 1253850-56-4), (8-anti)-8-(2-cyclopropylmethoxy-4-trifluoromethyl-phenoxy)-3-(6-trifluoromethyl-pyridazin-3-yl)-3-aza-bicyclo[3.2.1]octane (CAS 933798-27-7), (8-syn)-8-(2-cyclopropylmethoxy-4-trifluoromethyl-phenoxy)-3-(6-trifluoromethyl-pyridazin-3-yl)-3-aza-bicyclo [3.2.1]octane (known from WO 2007040280 A1, WO 2007040282 A1) (CAS 934001-66-8), N-[3-chloro-1-(3-pyridinyl)-1H-pyrazol-4-yl]-N-ethyl-3-[(3,3,3-trifluoropropyl)thio]-propanamide (known from WO 2015/058021 A1, WO 2015/058028 A1) (CAS 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl]methoxy]-pyrimidine (known from WO 2013/115391 A1) (CAS 1449021-97-9), 3-(4-chloro-2,6-dimethylphenyl)-4-hydroxy-8-methoxy-1-methyl-1,8-diazaspiro[4.5]dec-3-en-2-one (known from WO 2010/066780 A1, WO 2011/151146 A1) (CAS 1229023-34-0), 3-(4-chloro-2,6-dimethylphenyl)-8-methoxy-1-methyl-1,8-diazaspiro[4.5]decane-2,4-dione (known from WO 2014/187846 A1) (CAS 1638765-58-8), 3-(4-chloro-2,6-dimethylphenyl)-8-methoxy-1-methyl-2-oxo-1,8-diazaspiro[4.5]dec-3-en-4-yl-carbonic acid ethyl ester (known from WO 2010/066780 A1, WO 2011151146 A1) (CAS 1229023-00-0), N-[1-[(6-chloro-3-pyridinyl)methyl]-2(1H)-pyridinylidene]-2,2,2-trifluoro-acetamide (known from DE 3639877 A1, WO 2012029672 A1) (CAS 1363400-41-2), [N(E)]-N-[1-[(6-chloro-3-pyridinyl)methyl]-2(1H)-pyridinylidene]-2,2,2-trifluoro-acetamide, (known from WO 2016005276 A1) (CAS 1689566-03-7), [N(Z)]-N-[1-[(6-chloro-3-pyridinyl)methyl]-2(1H)-pyridinylidene]-2,2,2-trifluoro-acetamide, (CAS 1702305-40-5), 3-endo-3-[2-propoxy-4-(trifluoromethyl)phenoxy]-9-[[5-(trifluoromethyl)-2-pyridinyl]oxy]-9-azabicyclo[3.3.1]nonane (known from WO 2011/105506 A1, WO 2016/133011 A1) (CAS 1332838-17-1).

The active compound combinations can preferably be used as pesticides. They are active against normally sensitive and resistant species and against all or some stages of development. The abovementioned pests include:

pests from the phylum of the Arthropoda, in particular from the class of the Arachnida, for example *Acarus* spp., for example *Acarus siro*, *Aceria kuko*, *Aceria sheldoni*, *Aculops* spp., *Aculus* spp., for example *Aculus fockeui*, *Aculus schlechtendali*, *Amblyomma* spp., *Amphitetranychus viennensis*, *Argas* spp., *Boophilus* spp., *Brevipalpus* spp., for example *Brevipalpus phoenicis*, *Bryobia graminum*, *Bryobia praetiosa*, *Centruroides* spp., *Chorioptes* spp., *Dermanyssus gallinae*, *Dermatophagoides pteronyssinus*, *Dermatophagoides farinae*, *Dermacentor* spp., *Eotetranychus* spp., for example *Eotetranychus hicoriae*, *Epitrimerus pyri*, *Eutetranychus* spp., for example *Eutetranychus banksi*, *Eriophyes* spp., for example *Eriophyes pyri*, *Glycyphagus domesticus*, *Halotydeus destructor*, *Hemitarsonemus* spp., for example *Hemitarsonemus latus* (=*Polyphagotarsonemus latus*), *Hyalomma* spp., *Ixodes* spp., *Latrodectus* spp., *Loxosceles* spp., *Neutrombicula autumnalis*, *Nuphersa* spp., *Oligonychus* spp., for example *Oligonychus coffeae*, *Oligonychus coniferarum*, *Oligonychus ilicis*, *Oligonychus indicus*, *Oligonychus mangiferus*, *Oligonychus pratensis*, *Oligonychus punicae*, *Oligonychus yothersi*, *Ornithodorus* spp., *Ornithonyssus* spp., *Panonychus* spp., for example *Panonychus citri* (=*Metatetranychus citri*), *Panonychus ulmi* (=*Metatetranychus ulmi*), *Phyllocoptruta oleivora*, *Platytetranychus multidigituli*, *Polyphagotarsonemus latus*, *Psoroptes* spp., *Rhipicephalus* spp., *Rhizoglyphus* spp., *Sarcoptes* spp., *Scorpio maurus*, *Steneotarsonemus* spp., *Steneotarsonemus spinki*, *Tarsonemus* spp., for example *Tarsonemus confusus*, *Tarsonemus pallidus*, *Tetranychus* spp., for example *Tetranychus canadensis*, *Tetranychus cinnabarinus*, *Tetranychus turkestani*, *Tetranychus urticae*, *Trombicula alfreddugesi*, *Vaejovis* spp., *Vacates lycopersici*;

from the class of the Chilopoda, for example *Geophilus* spp., *Scutigera* spp.;

from the order or the class of the Collembola, for example *Onychiurus armatus*; *Sminthurus viridis*; from the class of the Diplopoda, for example *Blaniulus guttulatus*;

from the class of the Insecta, for example from the order of the Blattodea, for example *Blatta orientalis*, *Blattella asahinai*, *Blattella germanica*, *Leucophaea maderae*, *Loboptera decipiens*, *Neostylopyga rhombifolia*, *Panchlora* spp., *Parcoblatta* spp., *Periplaneta* spp., for example *Periplaneta americana*, *Periplaneta australasiae*, *Pycnoscelus surinamensis*, *Supella longipalpa*;

from the order of the Coleoptera, for example *Acalymma vittatum*, *Acanthoscelides obtectus*, *Adoretus* spp., *Aethina tumida*, *Agelastica alni*, *Agrilus* spp., for example *Agrilus planipennis*, *Agrilus coxalis*, *Agrilus bilineatus*, *Agrilus anxius*, *Agriotes* spp., for example *Agriotes linneatus*, *Agri-* otes mancus, Alphitobius diaperinus, Amphimallon solstitialis, Anobium punctatum, Anoplophora spp., for example Anoplophora glabripennis, Anthonomus spp., for example Anthonomus grandis, Anthrenus spp., Apion spp., Apogonia spp., Atomaria spp., for example Atomaria linearis, Attagenus spp., Bans caerulescens, Bruchidius obtectus, Bruchus spp., for example Bruchus pisorum, Bruchus rufimanus, Cassida spp., Cerotoma trifurcata, Ceutorrhynchus spp., for example Ceutorrhynchus assimilis, Ceutorrhynchus quadridens, Ceutorrhynchus rapae, Chaetocnema spp., for example Chaetocnema confinis, Chaetocnema denticulata, Chaetocnema ectypa, Cleonus mendicus, Conoderus spp., Cosmopolites spp., for example Cosmopolites sordidus, Costelytra zealandica, Ctenicera spp., Curculio spp., for example Curculio caryae, Curculio caryatrypes, Curculio obtusus, Curculio sayi, Cryptolestes ferrugineus, Cryptolestes pusillus, Cryptorhynchus lapathi, Cryptorhynchus mangiferae, Cylindrocopturus spp., Cylindrocopturus adspersus, Cylindrocopturus furnissi, Dendroctonus spp., for example Dendroctonus ponderosae, Dermestes spp., Diabrotica spp., for example Diabrotica balteata, Diabrotica barberi, Diabrotica undecimpunctata howardi, Diabrotica undecimpunctata undecimpunctata, Diabrotica virgifera virgifera, Diabrotica virgifera zeae, Dichocrocis spp., Dicladispa armigera, Diloboderus spp., Epicaerus spp., Epilachna spp., for example Epilachna borealis, Epilachna varivestis, Epitrix spp., for example Epitrix cucumeris, Epitrix furcula, Epitrix hirtipennis, Epitrix subcrinita, Epitrix tuberis, Faustinus spp., Gibbium psylloides, Gnathocerus cornutus, Hellula undalis, Heteronychus arator, Heteronyx spp., Hylamorpha elegans, Hylotrupes bajulus, Hypera postica, Hypomeces squamosus, Hypothenemus spp., for example Hypothenemus hampei, Hypothenemus obscurus, Hypothenemus pubescens, Lachnosterna consanguinea, Lasioderma serricorne, Latheticus oryzae, Lathridius spp., Lema spp., Leptinotarsa decemlineata, Leucoptera spp., for example Leucoptera coffeella, Limonius ectypus, Lissorhoptrus oryzophilus, Listronotus (=Hyperodes) spp., Lixus spp., Luperodes spp., Luperomorpha xanthodera, Lyctus spp., Megacyllene spp., for example Megacyllene robiniae, Megascelis spp., Melanotus spp., for example Melanotus longulus oregonensis, Meligethes aeneus, Melolontha spp., for example Melolontha melolontha, Migdolus spp., Monochamus spp., Naupactus xanthographus, Necrobia spp., Neogalerucella spp., Niptus hololeucus, Oryctes rhinoceros, Oryzaephilus surinamensis, Oryzaphagus oryzae, Otiorhynchus spp., for example Otiorhynchus cribricollis, Otiorhynchus ligustici, Otiorhynchus ovatus, Otiorhynchus rugosostriarus, Otiorhynchus sulcatus, Oulema spp., for example Oulema melanopus, Oulema oryzae, Oxycetonia jucunda, Phaedon cochleariae, Phyllophaga spp., Phyllophaga helleri, Phyllotreta spp., for example Phyllotreta armoraciae, Phyllotreta pusilla, Phyllotreta ramosa, Phyllotreta striolata, Popillia japonica, Premnotrypes spp., Prostephanus truncatus, Psylliodes spp., for example Psylliodes affinis, Psylliodes chrysocephala, Psylliodes punctulata, Ptinus spp., Rhizobius ventralis, Rhizopertha dominica, Rhynchophorus spp., Rhynchophorus ferrugineus, Rhynchophorus palmarum, Scolytus spp., for example Scolytus multistriatus, Sinoxylon perforans, Sitophilus spp., for example Sitophilus granarius, Sitophilus linearis, Sitophilus oryzae, Sitophilus zeamais, Sphenophorus spp., Stegobium paniceum, Sternechus spp., for example Sternechus paludatus, Symphyletes spp., Tanymecus spp., for example Tanymecus dilaticollis, Tanymecus indicus, Tanymecus palliatus, Tenebrio molitor, Tenebrioides mauretanicus, Tribolium spp., for example Tribolium audax, Tribolium castaneum, Tribolium confusum, Trogoderma spp., Tychius spp., Xylotrechus spp., Zabrus spp., for example Zabrus tenebrioides;

from the order of the Dermaptera, for example Anisolabis maritime, Forficula auricularia, Labidura riparia;

from the order of the Diptera, for example Aedes spp., for example Aedes aegypti, Aedes albopictus, Aedes sticticus, Aedes vexans, Agromyza spp., for example Agromyza frontella, Agromyza parvicornis, Anastrepha spp., Anopheles spp., for example Anopheles quadrimaculatus, Anopheles gambiae, Asphondylia spp., Bactrocera spp., for example Bactrocera cucurbitae, Bactrocera dorsalis, Bactrocera oleae, Bibio hortulanus, Calliphora erythrocephala, Calliphora vicina, Ceratitis capitata, Chironomus spp., Chrysomya spp., Chrysops spp., Chrysozona pluvialis, Cochliomya spp., Contarinia spp., for example Contarinia johnsoni, Contarinia nasturtii, Contarinia pyrivora, Contarinia schulzi, Contarinia sorghicola, Contarinia tritici, Cordylobia anthropophaga, Cricotopus sylvestris, Culex spp., for example Culex pipiens, Culex quinquefasciatus, Culicoides spp., Culiseta spp., Cuterebra spp., Dacus oleae, Dasineura spp., for example Dasineura brassicae, Delia spp., for example Delia antiqua, Delia coarctata, Delia florilega, Delia platura, Delia radicum, Dermatobia hominis, Drosophila spp., for example Drosphila melanogaster, Drosophila suzukii, Echinocnemus spp., Euleia heraclei, Fannia spp., Gasterophilus spp., Glossina spp., Haematopota spp., Hydrellia spp., Hydrellia griseola, Hylemya spp., Hippobosca spp., Hypoderma spp., Liriomyza spp., for example Liriomyza brassicae, Liriomyza huidobrensis, Liriomyza sativae, Lucilia spp., for example Lucilia cuprina, Lutzomyia spp., Mansonia spp., Musca spp., for example Musca domestica, Musca domestica vicina, Oestrus spp., Oscinella frit, Paratanytarsus spp., Paralauterborniella subcincta, Pegomya or Pegomyia spp., for example Pegomya betae, Pegomya hyoscyami, Pegomya rubivora, Phlebotomus spp., Phorbia spp., Phormia spp., Piophila casei, Platyparea poeciloptera, Prodiplosis spp., Psila rosae, Rhagoletis spp., for example Rhagoletis cingulata, Rhagoletis completa, Rhagoletis fausta, Rhagoletis indifferens, Rhagoletis mendax, Rhagoletis pomonella, Sarcophaga spp., Simulium spp., for example Simulium meridionale, Stomoxys spp., Tabanus spp., Tetanops spp., Tipula spp., for example Tipula paludosa, Tipula simplex, Toxotrypana curvicauda;

from the order of the Hemiptera, for example Acizzia acaciaebaileyanae, Acizzia dodonaeae, Acizzia uncatoides, Acrida turrita, Acyrthosipon spp., for example Acyrthosiphon pisum, Acrogonia spp., Aeneolamia spp., Agonoscena spp., Aleurocanthus spp., Aleyrodes proletella, Aleurolobus barodensis, Aleurothrixus floccosus, Allocaridara malayensis, Amrasca spp., for example Amrasca bigutulla, Amrasca devastans, Anuraphis cardui, Aonidiella spp., for example Aonidiella aurantii, Aonidiella citrina, Aonidiella inornata, Aphanostigma pini, Aphis spp., for example Aphis citricola, Aphis craccivora, Aphis fabae, Aphis forbesi, Aphis glycines, Aphis gossypii, Aphis hederae, Aphis illinoisensis, Aphis middletoni, Aphis nasturtii, Aphis nerii, Aphis pomi, Aphis spiraecola, Aphis viburniphila, Arboridia apicalis, Arytainilla spp., Aspidiella spp., Aspidiotus spp., for example Aspidiotus nerii, Atanus spp., Aulacorthum solani, Bemisia tabaci, Blastopsylla occidentalis, Boreioglycaspis melaleucae, Brachycaudus helichrysi, Brachycolus spp., Brevicoryne brassicae, Cacopsylla spp., for example Cacopsylla pyricola, Calligypona marginata, Capulinia spp., Carneocephala fulgida, Ceratovacuna lanigera, Cercopidae, Ceroplastes spp., Chaetosiphon fragaefolii, Chionaspis tegalensis, Chlorita onukii, Chondracris rosea, Chromaphis juglandicola, Chrysomphalus aonidum, Chrysomphalus ficus, Cicadulina mbila, Coccomytilus halli, Coccus spp., for example Coccus hesperidum, Coccus longulus, Coccus pseudomagnoliarum, Coccus viridis, Cryptomyzus ribis, Cryptoneossa spp., Ctenarytaina spp., Dalbulus spp., Dialeurodes chittendeni, Dialeurodes citri, Diaphorina citri, Diaspis spp., Diuraphis spp., Doralis spp., Drosicha spp., Dysaphis spp., for example Dysaphis apiifolia, Dysaphis plantaginea, Dysaphis tulipae, Dysmicoccus spp., Empoasca spp., for example Empoasca abrupta, Empoasca fabae, Empoasca maligna, Empoasca solana, Empoasca stevensi, Eriosoma spp., for example Eriosoma americanum, Eriosoma lanigerum, Eriosoma pyricola, Erythroneura spp., Eucalyptolyma spp., Euphyllura spp., Euscelis bilobatus, Ferrisia spp., Fiorinia spp., Furcaspis oceanica, Geococcus coffeae, Glycaspis spp., Heteropsylla cubana, Heteropsylla spinulosa, Homalodisca coagulata, Hyalopterus arundinis, Hyalopterus pruni, Icerya spp., for example Icerya purchasi, Idiocerus spp., Idioscopus spp., Laodelphax striatellus, Lecanium spp., for example Lecanium corni (=Parthenolecanium corni), Lepidosaphes spp., for example Lepidosaphes ulmi, Lipaphis erysimi, Lopholeucaspis japonica, Lycorma delicatula, Macrosiphum spp., for example Macrosiphum euphorbiae, Macrosiphum lilii, Macrosiphum rosae, Macrosteles facifrons, Mahanarva spp., Melanaphis sacchari, Metcalfiella spp., Metcalfa pruinosa, Metopolophium dirhodum, Monellia costalis, Monelliopsis pecanis, Myzus spp., for example Myzus ascalonicus, Myzus cerasi, Myzus ligustri, Myzus ornatus, Myzus persicae, Myzus nicotianae, Nasonovia ribisnigri, Neomaskellia spp., Nephotettix spp., for example Nephotettix cincticeps, Nephotettix nigropictus, Nettigoniclla spectra, Nilaparvata lugens, Oncometopia spp., Orthezia praelonga, Oxya chinensis, Pachypsylla spp., Parabemisia myricae, Paratrioza spp., for example Paratrioza cockerelli, Parlatoria spp., Pemphigus spp., for example Pemphigus bursarius, Pemphigus populivenae, Peregrinus maidis, Perkinsiella spp., Phenacoccus spp., for example Phenacoccus madeirensis, Phloeomyzus passerinii, Phorodon humuli, Phylloxera spp., for example Phylloxera devastatrix, Phylloxera notabilis, Pinnaspis aspidistrae, Planococcus spp., for example Planococcus citri, Prosopidopsylla flava, Protopulvinaria pyriformis, Pseudaulacaspis pentagona, Pseudococcus spp., for example Pseudococcus calceolariae, Pseudococcus comstocki, Pseudococcus longispinus, Pseudococcus maritimus, Pseudococcus viburni, Psyllopsis spp., Psylla spp., for example Psylla buxi, Psylla mali, Psylla pyri, Pteromalus spp., Pulvinaria spp., Pyrilla spp., Quadraspidiotus spp., for example Quadraspidiotus juglansregiae, Quadraspidiotus ostreaeformis, Quadraspidiotus perniciosus, Quesada gigas, Rastrococcus spp., Rhopalosiphum spp., for example Rhopalosiphum maidis, Rhopalosiphum oxyacanthae, Rhopalosiphum pacli, Rhopalosiphum rufiabdominale, Saissetia spp., for example Saissetia coffeae, Saissetia miranda, Saissetia neglecta, Saissetia oleae, Scaphoideus titanus, Schizaphis graminum, Selenaspidus articulatus, Sipha flava, Sitobion avenae, Sogata spp., Sogatella furcifera, Sogatodes spp., Stictocephala festina, Siphoninus phillyreae, Tenalaphara malayensis, Tetragonocephela spp., Tinocallis caryaefoliae, Tomaspis spp., Toxoptera spp., for example Toxoptera aurantii, Toxoptera citricidus, Trialeurodes vaporariorum, Trioza spp., for example Trioza diospyri, Typhlocyba spp., Unaspis spp., Viteus vitifolii, Zygina spp.;

from the suborder of the Heteroptera, for example Aelia spp., Anasa tristis, Antestiopsis spp., Boisea spp., Blissus spp., Calocoris spp., Campylomma livida, Cavelerius spp., Cimex spp., for example Cimex adjunctus, Cimex hemipterus, Cimex lectularius, Cimex pilosellus, Collaria spp., Creontiades dilutus, Dasynus piperic, Dichelops furcatus, Diconocoris hewetti, Dysdercus spp., Euschistus spp., for example Euschistus heron, Euschistus nervus, Euschistus tristigmus, Euschistus variolarius, Eurydema spp., Eurygaster spp., Halyomorpha halys, Heliopeltis spp., Horcias nobilellus, Leptocorisa spp., Leptocorisa varicornis, Leptoglossus occidentalis, Leptoglossus phyllopus, Lygocoris spp., for example Lygocoris pabulinus, Lygus spp., for example Lygus elisus, Lygus hesperus, Lygus lineolaris, Macropes excavatus, Megacopta cribraria, Miridae, Monalonion atratum, Nezara spp., for example Nezara viridula, Nysius spp., Oebalus spp., Pentomidae, Piesma quadrata, Piezodorus spp., for example Piezodorus guildinii, Psallus spp., Pseudacysta persea, Rhodnius spp., Sahlbergella singularis, Scaptocoris castanea, Scotinophora spp., Stephanitis nashi, Tibraca spp., Triatoma spp.;

from the order of the Hymenoptera, for example Acromyrmex spp., Athalia spp., for example Athalia rosae, Atta spp., Camponotus spp., Dolichovespula spp., Diprion spp., for example Diprion similis, Hoplocampa spp., for example Hoplocampa cookei, Hoplocampa testudinea, Lasius spp., Linepithema (Iridiomyrmex) humile, Monomorium pharaonic, Paratrechina spp., Paravespula spp., Plagiolepis spp., Sirex spp., for example Sirex noctilio, Solenopsis invicta, Tapinoma spp., Technomyrmex albipes, Urocerus spp., Vespa spp., for example Vespa crabro, Wasmannia auropunctata, Xeris spp.;

from the order of the Isopoda, for example Armadillidium vulgare, Oniscus asellus, Porcellio scaber;

from the order of the Isoptera, for example Coptotermes spp., for example Coptotermes formosanus, Cornitermes cumulans, Cryptotermes spp., Incisitermes spp., Kalotermes spp., Microtermes obeli, Nasutitermes spp., Odontotermes spp., Porotermes spp., Reticulitermes spp., for example Reticulitermes flavipes, Reticulitermes hesperus;

from the order of the Lepidoptera, for example Achroia grisella, Acronicta major, Adoxophyes spp., for example Adoxophyes orana, Aedia leucomelas, Agrotis spp., for example Agrotis segetum, Agrotis ipsilon, Alabama spp., for example Alabama argillacea, Amyelois transitella, Anarsia spp., Anticarsia spp., for example Anticarsia gemmatalis, Argyroploce spp., Autographa spp., Barathra brassicae, Blastodacna atra, Borbo cinnara, Bucculatrix thurberiella, Bupalus piniarius, Busseola spp., Cacoecia spp., Caloptilia theivora, Capua reticulana, Carpocapsa pomonella, Carposina niponensis, Cheimatobia brumata, Chilo spp., for example Chilo plejadellus, Chilo suppressalis, Choreutis pariana, Choristoneura spp., Chrysodeixis chalcites, Clysia ambiguella, Cnaphalocerus spp., Cnaphalocrocis medinalis, Cnephasia spp., Conopomorpha spp., Conotrachelus spp., Copitarsia spp., Cydia spp., for example Cydia nigricana, Cydia pomonella, Dalaca noctuides, Diaphania spp., Diparopsis spp., Diatraea saccharalis, Dioryctria spp., for example Dioryctria zimmermani, Earias spp., Ecdytolopha aurantium, Elasmopalpus lignosellus, Eldana saccharina, Ephestia spp., for example Ephestia elutella, Ephestia kuehniella, Epinotia spp., Epiphyas postvittana, Erannis spp., Erschoviella musculana, Etiella spp., Eudocima spp., Eulia spp., Eupoecilia ambiguella, Euproctis spp., for example Euproctis chrysorrhoea, Euxoa spp., Feltia spp., Galleria mellonella, Gracillaria spp., Grapholitha spp., for example Grapholita molesta, Grapholita prunivora, Hedylepta spp., Helicoverpa spp., for example Helicoverpa armigera, Helicoverpa zea, Heliothis spp., for example Heliothis virescens, Hofmannophila pseudospretella, Homoeosoma spp.,

*Homona* spp., *Hyponomeuta padella*, *Kakivoria flavofasciata*, *Lampides* spp., *Laphygma* spp., *Laspeyresia molesta*, *Leucinodes orbonalis*, *Leucoptera* spp., for example *Leucoptera coffeella*, *Lithocolletis* spp., for example *Lithocolletis blancardella*, *Lithophane antennata*, *Lobesia* spp., for example *Lobesia botrana*, *Loxagrotis albicosta*, *Lymantria* spp., for example *Lymantria dispar*, *Lyonetia* spp., for example *Lyonetia clerkella*, *Malacosoma neustria*, *Maruca testulalis*, *Mamestra brassicae*, *Melanitis leda*, *Mocis* spp., *Monopis obviella*, *Mythimna separata*, *Nemapogon cloacellus*, *Nymphula* spp., *Oiketicus* spp., *Omphisa* spp., *Operophtera* spp., *Oria* spp., *Orthaga* spp., *Ostrinia* spp., for example *Ostrinia nubilalis*, *Panolis flammea*, *Parnara* spp., *Pectinophora* spp., for example *Pectinophora gossypiella*, *Perileucoptera* spp., *Phthorimaea* spp., for example *Phthorimaea operculella*, *Phyllocnistis citrella*, *Phyllonorycter* spp., for example *Phyllonorycter blancardella*, *Phyllonorycter crataegella*, *Pieris* spp., for example *Pieris rapae*, *Platynota stultana*, *Plodia interpunctella*, *Plusia* spp., *Plutella xylostella* (=*Plutella maculipennis*), *Podesia* spp., for example *Podesia syringae*, *Prays* spp., *Prodenia* spp., *Protoparce* spp., *Pseudaletia* spp., for example *Pseudaletia unipuncta*, *Pseudoplusia includens*, *Pyrausta nubilalis*, *Rachiplusia nu*, *Schoenobius* spp., for example *Schoenobius bipunctifer*, *Scirpophaga* spp., for example *Scirpophaga innotata*, *Scotia segetum*, *Sesamia* spp., for example *Sesamia inferens*, *Sparganothis* spp., *Spodoptera* spp., for example *Spodoptera eradiana*, *Spodoptera exigua*, *Spodoptera frugiperda*, *Spodoptera praefica*, *Stathmopoda* spp., *Stenoma* spp., *Stomopteryx subsecivella*, *Synanthedon* spp., *Tecia solanivora*, *Thaumetopoea* spp., *Thermesia gemmatalis*, *Tinea cloacella*, *Tinea pellionella*, *Tineola bisselliella*, *Tortrix* spp., *Trichophaga tapetzella*, *Trichoplusia* spp., for example *Trichoplusia ni*, *Tryporyza incertulas*, *Tuta absoluta*, *Virachola* spp.;

from the order of the Orthoptera or Saltatoria, for example *Acheta domesticus*, *Dichroplus* spp., *Gryllotalpa* spp., for example *Gryllotalpa gryllotalpa*, *Hieroglyphus* spp., *Locusta* spp., for example *Locusta migratoria*, *Melanoplus* spp., for example *Melanoplus devastator*, *Paratlanticus ussuriensis*, *Schistocerca gregaria*;

from the order of the Phthiraptera, for example *Damalinia* spp., *Haematopinus* spp., *Linognathus* spp., *Pediculus* spp., *Phylloxera vastatrix*, *Phthirus pubis*, *Trichodectes* spp.;

from the order of the Psocoptera, for example *Lepinotus* spp., *Liposcelis* spp.;

from the order of the Siphonaptera, for example, *Ceratophyllus* spp., *Ctenocephalides* spp., for example *Ctenocephalides canis*, *Ctenocephalides felis*, *Pulex irritans*, *Tunga penetrans*, *Xenopsylla cheopis*;

from the order of the Thysanoptera, for example *Anaphothrips obscurus*, *Baliothrips biformis*, *Chaetanaphothrips leeuweni*, *Drepanothrips reuteri*, *Enneothrips Havens*, *Frankliniella* spp., for example *Frankliniella furca*, *Frankliniella occidentalis*, *Frankliniella schultzei*, *Frankliniella tritici*, *Frankliniella vaccinii*, *Frankliniella williamsi*, *Haplothrips* spp., *Heliothrips* spp., *Hercinothrips femoralis*, *Kakothrips* spp., *Rhipiphorothrips cruentatus*, *Scirtothrips* spp., *Taeniothrips cardamomi*, *Thrips* spp., for example *Thrips palmi*, *Thrips tabaci*;

from the order of the Zygentoma (=*Thysanura*), for example *Ctenolepisma* spp., *Lepisma saccharina*, *Lepismodes inquilinus*, *Thermobia domestica*;

from the class of the Symphyla, for example *Scutigerella* spp., for example *Scutigerella immaculata*;

pests from the phylum of the Mollusca, for example from the class of the *Bivalvia*, for example *Dreissena* spp., and also from the class of the Gastropoda, for example *Anion* spp., for example *Anion ater rufus*, *Biomphalaria* spp., *Bulinus* spp., *Deroceras* spp., for example *Deroceras laeve*, *Galba* spp., *Lymnaea* spp., *Oncomelania* spp., *Pomacea* spp., *Succinea* spp.;

plant pests from the phylum of the Nematoda, i.e. phytoparasitic nematodes, in particular *Aglenchus* spp., for example *Aglenchus agricola*, *Anguina* spp., for example *Anguina tritici*, *Aphelenchoides* spp., for example *Aphelenchoides arachidis*, *Aphelenchoides fragariae*, *Belonolaimus* spp., for example *Belonolaimus gracilis*, *Belonolaimus longicaudatus*, *Belonolaimus nortoni*, *Bursaphelenchus* spp., for example *Bursaphelenchus cocophilus*, *Bursaphelenchus eremus*, *Bursaphelenchus xylophilus*, *Cacopaurus* spp., for example *Cacopaurus pestis*, *Criconemella* spp., for example *Criconemella curvata*, *Criconemella onoensis*, *Criconemella ornata*, *Criconemella rusium*, *Criconemella xenoplax* (=*Mesocriconema xenoplax*), *Criconemoides* spp., for example *Criconemoides ferniae*, *Criconemoides onoense*, *Criconemoides ornatum*, *Ditylenchus* spp., for example *Ditylenchus dipsaci*, *Dolichodorus* spp., *Globodera* spp., for example *Globodera pallida*, *Globodera rostochiensis*, *Helicotylenchus* spp., for example *Helicotylenchus dihystera*, *Hemicriconemoides* spp., *Hemicycliophora* spp., *Heterodera* spp., for example *Heterodera avenae*, *Heterodera glycines*, *Heterodera schachtii*, *Hirschmaniella* spp., *Hoplolaimus* spp., *Longidorus* spp., for example *Longidorus africanus*, *Meloidogyne* spp., for example *Meloidogyne chitwoodi*, *Meloidogyne fallax*, *Meloidogyne hapla*, *Meloidogyne incognita*, *Meloinema* spp., *Nacobbus* spp., *Neotylenchus* spp., *Paralongidorus* spp., *Paraphelenchus* spp., *Paratrichodorus* spp., for example *Paratrichodorus minor*, *Paratylenchus* spp., *Pratylenchus* spp., for example *Pratylenchus penetrans*, *Pseudohalenchus* spp., *Psilenchus* spp., *Punctodera* spp., *Quinisulcius* spp., *Radopholus* spp., for example *Radopholus citrophilus*, *Radopholus similis*, *Rotylenchulus* spp., *Rotylenchus* spp., *Scutellonema* spp., *Subanguina* spp., *Trichodorus* spp., for example *Trichodorus obtusus*, *Trichodorus primitivus*, *Tylenchorhynchus* spp., for example *Tylenchorhynchus annulatus*, *Tylenchulus* spp., for example *Tylenchulus semipenetrans*, *Xiphinema* spp., for example *Xiphinema index*.

Formulations

The present invention further relates to formulations and use forms prepared therefrom as pesticides, for example drench, drip and spray liquors, comprising an active compound combination according to the invention. In some cases, the use forms comprise further pesticides and/or adjuvants which improve action, such as penetrants, e.g. vegetable oils, for example rapeseed oil, sunflower oil, mineral oils, for example paraffin oils, alkyl esters of vegetable fatty acids, for example rapeseed oil methyl ester or soya oil methyl ester, or alkanol alkoxylates and/or spreaders, for example alkylsiloxanes and/or salts, for example organic or inorganic ammonium or phosphonium salts, for example ammonium sulphate or diammonium hydrogenphosphate and/or retention promoters, for example dioctyl sulphosuccinate or hydroxypropyl guar polymers and/or humectants, for example glycerol and/or fertilizers, for example ammonium-, potassium- or phosphorus-containing fertilizers.

Customary formulations are, for example, water-soluble liquids (SL), emulsion concentrates (EC), emulsions in water (EW), suspension concentrates (SC, SE, FS, OD), water-dispersible granules (WG), granules (GR) and capsule concentrates (CS); these and further possible formulation types are described, for example, by Crop Life International and in Pesticide Specifications, Manual on development and use of FAO and WHO specifications for pesticides, FAO Plant Production and Protection Papers—173, prepared by the FAO/WHO Joint Meeting on Pesticide Specifications, 2004, ISBN: 9251048576. The formulations, in addition to the active compound combination according to the invention, optionally comprise further agrochemically active compounds.

These are preferably formulations or use forms which comprise auxiliaries, for example extenders, solvents, spontaneity promoters, carriers, emulsifiers, dispersants, frost protectants, biocides, thickeners and/or further auxiliaries, for example adjuvants. An adjuvant in this context is a component which enhances the biological effect of the formulation, without the component itself having any biological effect. Examples of adjuvants are agents which promote retention, spreading, attachment to the leaf surface or penetration.

These formulations are prepared in a known way, for example by mixing the active compound combination according to the invention with auxiliaries such as, for example, extenders, solvents and/or solid carriers and/or other auxiliaries such as, for example, surfactants. The formulations are prepared either in suitable facilities or else before or during application.

The auxiliaries used may be substances suitable for imparting special properties, such as certain physical, technical and/or biological properties, to the formulation of the active compound combination according tot he invention, or to the use forms prepared from these formulations (for example ready-to-use pesticides such as spray liquors or seed dressing products).

Suitable extenders are, for example, water, polar and nonpolar organic chemical liquids, for example from the classes of the aromatic and non-aromatic hydrocarbons (such as paraffins, alkylbenzenes, alkylnaphthalenes, chlorobenzenes), the alcohols and polyols (which, if appropriate, may also be substituted, etherified and/or esterified), the ketones (such as acetone, cyclohexanone), the esters (including fats and oils) and (poly)ethers, the unsubstituted and substituted amines, amides, lactams (such as N-alkylpyrrolidones) and lactones, the sulphones and sulphoxides (such as dimethyl sulphoxide), the carbonates and the nitriles.

If the extender used is water, it is also possible to employ, for example, organic solvents as auxiliary solvents. Essentially, suitable liquid solvents are: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, alcohols such as butanol or glycol and their ethers and esters, ketones such as acetone, methyl ethyl ketone, methyl isobutyl ketone or cyclohexanone, strongly polar solvents such as dimethylformamide or dimethyl sulphoxide, carbonates such as propylene carbonate, butylene carbonate, diethyl carbonate or dibutyl carbonate, or nitriles such as acetonitrile or propanenitrile.

In principle, it is possible to use all suitable solvents. Examples of suitable solvents are aromatic hydrocarbons, such as xylene, toluene or alkylnaphthalenes, chlorinated aromatic or chlorinated aliphatic hydrocarbons, such as chlorobenzene, chloroethylene or methylene chloride, aliphatic hydrocarbons, such as cyclohexane, paraffins, petroleum fractions, mineral and vegetable oils, alcohols, such as methanol, ethanol, isopropanol, butanol or glycol and their ethers and esters, ketones such as acetone, methyl ethyl ketone, methyl isobutyl ketone or cyclohexanone, strongly polar solvents, such as dimethyl sulphoxide, carbonates such as propylene carbonate, butylene carbonate, diethyl carbonate or dibutyl carbonate, nitriles such as acetonitrile or propanenitrile, and also water.

In principle, it is possible to use all suitable carriers. Useful carriers include especially: for example ammonium salts and ground natural minerals such as kaolins, clays, talc, chalk, quartz, attapulgite, montmorillonite or diatomaceous earth, and ground synthetic materials such as finely divided silica, alumina and natural or synthetic silicates, resins, waxes and/or solid fertilizers. Mixtures of such carriers can likewise be used. Useful carriers for granules include: for example crushed and fractionated natural rocks such as calcite, marble, pumice, sepiolite, dolomite, and synthetic granules of inorganic and organic meals, and also granules of organic material such as sawdust, paper, coconut shells, corn cobs and tobacco stalks.

Liquefied gaseous extenders or solvents can also be used. Particularly suitable extenders or carriers are those which are gaseous at ambient temperature and under atmospheric pressure, for example aerosol propellant gases, such as halohydrocarbons, and also butane, propane, nitrogen and carbon dioxide.

Examples of emulsifiers and/or foam-formers, dispersants or wetting agents with ionic or nonionic properties, or mixtures of these surfactants, are salts of polyacrylic acid, salts of lignosulphonic acid, salts of phenolsulphonic acid or naphthalenesulphonic acid, polycondensates of ethylene oxide with fatty alcohols or with fatty acids or with fatty amines, with substituted phenols (preferably alkylphenols or arylphenols), salts of sulphosuccinic esters, taurine derivatives (preferably alkyl taurates), isethionate derivatives, phosphoric esters of polyethoxylated alcohols or phenols, fatty esters of polyols, and derivatives of the compounds containing sulphates, sulphonates and phosphates, for example alkylaryl polyglycol ethers, alkylsulphonates, alkyl sulphates, arylsulphonates, protein hydrolysates, lignosulphite waste liquors and methylcellulose. The presence of a surfactant is advantageous if at least one of the compounds of the active compound combination according to the invention and/or one of the inert carriers is insoluble in water and when the application takes place in water.

It is possible to use colorants such as inorganic pigments, for example iron oxide, titanium oxide and Prussian Blue, and organic dyes such as alizarin dyes, azo dyes and metal phthalocyanine dyes, and nutrients and trace nutrients such as salts of iron, manganese, boron, copper, cobalt, molybdenum and zinc as further auxiliaries in the formulations and the use forms derived therefrom.

Additional components may be stabilizers, such as low-temperature stabilizers, preservatives, antioxidants, light stabilizers or other agents which improve chemical and/or physical stability. Foam formers or antifoams may also be present.

Tackifiers such as carboxymethylcellulose and natural and synthetic polymers in the form of powders, granules or latices, such as gum arabic, polyvinyl alcohol and polyvinyl acetate, or else natural phospholipids such as cephalins and lecithins and synthetic phospholipids may also be present as additional auxiliaries in the formulations and the use forms derived therefrom. Further possible auxiliaries are mineral and vegetable oils.

Optionally, further auxiliaries may be present in the formulations and the use forms derived therefrom. Examples of such additives include fragrances, protective colloids, binders, adhesives, thickeners, thixotropic agents, penetrants, retention promoters, stabilizers, sequestrants, complexing agents, humectants, spreaders. In general, the active compound combination according tot he invention can be combined with any solid or liquid additive commonly used for formulation purposes.

Useful retention promoters include all those substances which reduce the dynamic surface tension, for example dioctyl sulphosuccinate, or increase the viscoelasticity, for example hydroxypropylguar polymers.

Suitable penetrants in the present context are all those substances which are usually used for improving the penetration of agrochemical active compounds into plants. Penetrants are defined in this context by their ability to penetrate from the (generally aqueous) application liquor and/or from the spray coating into the cuticle of the plant and thereby increase the mobility of active compounds in the cuticle. The method described in the literature (Baur et al., 1997, Pesticide Science 51, 131-152) can be used to determine this property. Examples include alcohol alkoxylates such as coconut fatty ethoxylate (10) or isotridecyl ethoxylate (12), fatty acid esters, for example rapeseed oil methyl ester or soya oil methyl ester, fatty amine alkoxylates, for example tallowamine ethoxylate (15), or ammonium and/or phosphonium salts, for example ammonium sulphate or diammonium hydrogenphosphate.

The formulations preferably comprise between 0.00000001 and 98% by weight of the active compound combination according to the invention or, with particular preference, between 0.01% and 95% by weight of the active compound combination according to the invention, more preferably between 0.5% and 90% by weight of the active compound combination according to the invention, based on the weight of the formulation.

The content of the compound of the active compound combination according to the invention in the use forms prepared from the formulations (in particular pesticides) may vary within wide ranges. The concentration of the active compound combination according to the invention in the use forms is usually between 0.00000001 and 95% by weight of the active compound combination according to the invention, preferably between 0.00001 and 1% by weight, based on the weight of the use form. The compounds are employed in a customary manner appropriate for the use forms.

Plants and Plant Parts

All plants and plant parts can be treated in accordance with the invention. Here, plants are to be understood to mean all plants and plant parts such as wanted and unwanted wild plants or crop plants (including naturally occurring crop plants), for example cereals (wheat, rice, triticale, barley, rye, oats), maize, soya bean, potato, sugar beet, sugar cane, tomatoes, pepper, cucumber, melon, carrot, watermelon, onion, lettuce, spinach, leek, beans, *Brassica oleracea* (e.g. cabbage) and other vegetable species, cotton, tobacco, oilseed rape, and also fruit plants (with the fruits apples, pears, citrus fruits and grapevines). Crop plants can be plants which can be obtained by conventional breeding and optimization methods or by biotechnological and genetic engineering methods or combinations of these methods, including the transgenic plants and including the plant varieties which can or cannot be protected by varietal property rights. Plants should be understood to mean all developmental stages, such as seeds, seedlings, young (immature) plants up to mature plants. Plant parts should be understood to mean all parts and organs of the plants above and below ground, such as shoot, leaf, flower and root, examples given being leaves, needles, stalks, stems, flowers, fruit bodies, fruits and seeds, and also tubers, roots and rhizomes. Parts of plants also include harvested plants or harvested plant parts and vegetative and generative propagation material, for example seedlings, tubers, rhizomes, cuttings and seeds.

Treatment according to the invention of the plants and plant parts with the active compound combination according to the invention is carried out directly or by allowing the compounds to act on the surroundings, environment or storage space by the customary treatment methods, for example by immersion, spraying, evaporation, fogging, scattering, painting on, injection and, in the case of propagation material, in particular in the case of seeds, also by applying one or more coats.

As already mentioned above, it is possible to treat all plants and their parts according to the invention. In a preferred embodiment, wild plant species and plant cultivars, or those obtained by conventional biological breeding methods, such as crossing or protoplast fusion, and also parts thereof, are treated. In a further preferred embodiment, transgenic plants and plant cultivars obtained by genetic engineering methods, if appropriate in combination with conventional methods (genetically modified organisms), and parts thereof are treated. The term "parts" or "parts of plants" or "plant parts" has been explained above. The invention is used with particular preference to treat plants of the respective commercially customary cultivars or those that are in use. Plant cultivars are to be understood as meaning plants having new properties ("traits") and which have been obtained by conventional breeding, by mutagenesis or by recombinant DNA techniques. They can be cultivars, varieties, bio- or genotypes.

Transgenic Plant, Seed Treatment and Integration Events

The transgenic plants or plant cultivars (those obtained by genetic engineering) which are to be treated with preference in accordance with the invention include all plants which, through the genetic modification, received genetic material which imparts particular advantageous useful properties ("traits") to these plants. Examples of such properties are better plant growth, increased tolerance to high or low temperatures, increased tolerance to drought or to levels of water or soil salinity, enhanced flowering performance, easier harvesting, accelerated ripening, higher yields, higher quality and/or a higher nutritional value of the harvested products, better storage life and/or processability of the harvested products. Further and particularly emphasized examples of such properties are increased resistance of the plants against animal and microbial pests, such as against insects, arachnids, nematodes, mites, slugs and snails owing, for example, to toxins formed in the plants, in particular those formed in the plants by the genetic material from *Bacillus thuringiensis* (for example by the genes CryIA(a), CryIA(b), CryIA(c), CryIIA, CryIIIA, CryIIIB2, Cry9c Cry2Ab, Cry3Bb and CryIF and also combinations thereof), furthermore increased resistance of the plants against phytopathogenic fungi, bacteria and/or viruses owing, for example, to systemic acquired resistance (SAR), systemin, phytoalexins, elicitors and also resistance genes and correspondingly expressed proteins and toxins, and also increased tolerance of the plants to certain herbicidally active compounds, for example imidazolinones, sulphonylureas, glyphosate or phosphinothricin (for example the "PAT" gene). The genes which impart the desired traits in question may also be present in combinations with one another in the transgenic plants. Examples of transgenic plants which may be mentioned are the important crop plants, such as cereals (wheat, rice, triticale, barley, rye, oats), maize, soya beans, potatoes, sugar beet, sugar cane, tomatoes, peas and other types of vegetable, cotton, tobacco, oilseed rape and also fruit plants (with the fruits apples, pears, citrus fruits and grapes), with particular emphasis being given to maize, soya beans, wheat, rice, potatoes, cotton, sugar cane, tobacco and oilseed rape. Traits which are particularly emphasized are the increased resistance of the plants to insects, arachnids, nematodes and slugs and snails.

Crop Protection—Types of Treatment

The treatment of the plants and plant parts with the compounds of the active compound combination according to the invention is carried out directly or by action on their surroundings, habitat or storage space using customary treatment methods, for example by dipping, spraying, atomizing, irrigating, evaporating, dusting, fogging, broadcasting, foaming, painting, spreading-on, injecting, watering (drenching), drip irrigating and, in the case of propagation material, in particular in the case of seed, furthermore as a powder for dry seed treatment, a solution for liquid seed treatment, a water-soluble powder for slurry treatment, by incrusting, by coating with one or more coats, etc. It is furthermore possible to apply the active compound combination according to the invention by the ultra-low volume method or to inject the application form or the active compound combination according to the invention itself into the soil.

A preferred direct treatment of the plants is foliar application, i.e. the active compound combination according to the invention is applied to the foliage, where treatment frequency and the application rate should be adjusted according to the level of infestation with the pest in question.

In the case of systemically active compounds, the active compound combination according to the invention also access the plants via the root system. The plants are then treated by the action of the active compound combination according to the invention on the habitat of the plant. This may be done, for example, by drenching, or by mixing into the soil or the nutrient solution, i.e. the locus of the plant (e.g. soil or hydroponic systems) is impregnated with a liquid form of the active compound combination according to the invention, or by soil application, i.e. the active compound combination according to the invention is introduced in solid form (e.g. in the form of granules) into the locus of the plants, or by drip application (often also referred to as "chemigation"), i.e. the liquid application of the active compound combination according to the invention from surface or sub-surface driplines over a certain period of time together with varying amounts of water at defined locations in the vicinity of the plants. In the case of paddy rice crops, this can also be done by metering the active compound combination according to the invention in a solid application form (for example as granules) into a flooded paddy field.

Treatment of Seed

The control of animal pests by treating the seed of plants has been known for a long time and is the subject of continuous improvements. However, the treatment of seed entails a series of problems which cannot always be solved in a satisfactory manner. Thus, it is desirable to develop methods for protecting the seed and the germinating plant which dispense with, or at least reduce considerably, the additional application of pesticides during storage, after sowing or after emergence of the plants. It is furthermore desirable to optimize the amount of active compound employed in such a way as to provide optimum protection for the seed and the germinating plant from attack by animal pests, but without damaging the plant itself by the active compound employed. In particular, methods for the treatment of seed should also take into consideration the intrinsic insecticidal or nematicidal properties of pest-resistant or -tolerant transgenic plants in order to achieve optimum protection of the seed and also the germinating plant with a minimum of pesticides being employed.

The present invention therefore in particular also relates to a method for the protection of seed and germinating plants, from attack by pests, by treating the seed with an active compound combination according to the invention. The method according to the invention for protecting seed and germinating plants against attack by pests furthermore comprises a method where the seed is treated simultaneously in one operation or sequentially with the compound of formula (I) and the mixing partner of group (II).

It also comprises a method where the seed is treated at different times with the compound of formula (I) and the mixing partner of group (II).

The invention likewise relates to the use of the active compound combination according to the invention for the treatment of seed for protecting the seed and the resulting plant from animal pests.

Furthermore, the invention relates to seed which has been treated with an active compound combination according to the invention so as to afford protection from animal pests. The invention also relates to seed which has been treated simultaneously with an active compound combination according to the invention. The invention furthermore relates to seed which has been treated at different times with the compound of formula (I) and the mixing partner of group (II). In the case of seed which has been treated at different points in time with an active compound combination according to the invention, the individual substances may be present on the seed in different layers. Here, the layers comprising a compound of the formula (I) and a mixing partner of group (II) may optionally be separated by an intermediate layer. The invention also relates to seed where a compound of the formula (I) and a mixing partner of group (II) have been applied as component of a coating or as a further layer or further layers in addition to a coating.

Furthermore, the invention relates to seed which, after the treatment with an active compound combination according to the invention, is subjected to a film-coating process to prevent dust abrasion on the seed.

One of the advantages encountered with a systemically acting active compound combination according to the invention is the fact that, by treating the seed, not only the seed itself but also the plants resulting therefrom are, after emergence, protected against animal pests. In this manner, the immediate treatment of the crop at the time of sowing or shortly thereafter can be dispensed with.

It has to be considered a further advantage that by treatment of the seed with an active compound combination according to the invention, germination and emergence of the treated seed may be enhanced.

It is likewise to be considered advantageous that an active compound combination according to the invention can be used in particular also for transgenic seed.

Furthermore, active compound combinations according to the invention can be employed in combination with compositions or compounds of signalling technology, leading to better colonization by symbionts such as, for example, rhizobia, mycorrhizae and/or endophytic bacteria or fungi, and/or to optimized nitrogen fixation.

The active compound combinations according to the invention are suitable for protection of seed of any plant variety which is used in agriculture, in the greenhouse, in forests or in horticulture. In particular, this takes the form of seed of cereals (for example wheat, barley, rye, millet and oats), corn, cotton, soya beans, rice, potatoes, sunflowers, coffee, tobacco, canola, oilseed rape, beets (for example sugarbeets and fodder beets), peanuts, vegetables (for example tomatoes, cucumbers, bean, cruciferous vegetables, onions and lettuce), fruit plants, lawns and ornamental plants. The treatment of the seed of cereals (such as wheat, barley, rye and oats), maize, soya beans, cotton, canola, oilseed rape, vegetables and rice is of particular importance.

As already mentioned above, the treatment of transgenic seed with an active compound combination according to the invention is also of particular importance. This takes the form of seed of plants which, as a rule, comprise at least one heterologous gene which governs the expression of a polypeptide with in particular insecticidal and/or nematicidal properties. The heterologous genes in transgenic seed can originate from microorganisms such as *Bacillus, Rhizobium, Pseudomonas, Serratia, Trichoderma, Clavibacter, Glomus* or *Gliocladium*. The present invention is particularly suitable for the treatment of transgenic seed which comprises at least one heterologous gene originating from *Bacillus* sp. It is particularly preferably a heterologous gene derived from *Bacillus thuringiensis*.

In the context of the present invention, the active compound combination according to the invention is applied to the seed. Preferably, the seed is treated in a state in which it is stable enough to avoid damage during treatment. In general, the seed may be treated at any point in time between harvest and sowing. The seed usually used has been separated from the plant and freed from cobs, shells, stalks, coats, hairs or the flesh of the fruits. For example, it is possible to use seed which has been harvested, cleaned and dried down to a moisture content which allows storage. Alternatively, it is also possible to use seed which, after drying, has been treated with, for example, water and then dried again, for example priming. In the case of rice seed, it is also possible to use seed which has been soaked, for example in water to a certain stage of the rice embryo ('pigeon breast stage'), stimulating the germination and a more uniform emergence.

When treating the seed, care must generally be taken that the amount of the active compound combination according to the invention applied to the seed and/or the amount of further additives is chosen in such a way that the germination of the seed is not adversely affected, or that the resulting plant is not damaged. This must be ensured particularly in the case of active compounds which can exhibit phytotoxic effects at certain application rates.

In general, the active compound combinations according to the invention are applied to the seed in a suitable formulation. Suitable formulations and processes for seed treatment are known to the person skilled in the art.

The active compound combinations according to the invention can be converted to the customary seed dressing formulations, such as solutions, emulsions, suspensions, powders, foams, slurries or other coating compositions for seed, and also ULV formulations.

These formulations are prepared in a known manner, by mixing the active compound combinations according to the invention with customary additives such as, for example, customary extenders and also solvents or diluents, colorants, wetting agents, dispersants, emulsifiers, antifoams, preservatives, secondary thickeners, adhesives, gibberellins and also water.

Colorants which may be present in the seed-dressing formulations which can be used in accordance with the invention are all colorants which are customary for such purposes. It is possible to use either pigments, which are sparingly soluble in water, or dyes, which are soluble in water. Examples include the dyes known by the names Rhodamine B, C. I. Pigment Red 112 and C. I. Solvent Red 1.

Useful wetting agents which may be present in the seed dressing formulations usable in accordance with the invention are all substances which promote wetting and which are conventionally used for the formulation of agrochemically active compounds. Preference is given to using alkylnaphthalenesulphonates, such as diisopropyl- or diisobutylnaphthalenesulphonates.

Useful dispersants and/or emulsifiers which may be present in the seed dressing formulations usable in accordance with the invention are all nonionic, anionic and cationic dispersants conventionally used for the formulation of active agrochemical ingredients. Preference is given to using nonionic or anionic dispersants or mixtures of nonionic or anionic dispersants. Suitable nonionic dispersants include in particular ethylene oxide/propylene oxide block polymers, alkylphenol polyglycol ethers and tristryrylphenol polyglycol ethers, and the phosphated or sulphated derivatives thereof. Suitable anionic dispersants are in particular lignosulphonates, polyacrylic acid salts and arylsulphonate/formaldehyde condensates.

Antifoams which may be present in the seed dressing formulations usable in accordance with the invention are all foam-inhibiting substances conventionally used for the formulation of active agrochemical ingredients. Preference is given to using silicone antifoams and magnesium stearate.

Preservatives which may be present in the seed dressing formulations usable in accordance with the invention are all substances usable for such purposes in agrochemical compositions. Examples include dichlorophene and benzyl alcohol hemiformal.

Secondary thickeners which may be present in the seed dressing formulations usable in accordance with the invention are all substances which can be used for such purposes in agrochemical compositions. Cellulose derivatives, acrylic acid derivatives, xanthan, modified clays and finely divided silica are preferred.

Adhesives which may be present in the seed dressing formulations usable in accordance with the invention are all customary binders usable in seed dressing products. Polyvinylpyrrolidone, polyvinyl acetate, polyvinyl alcohol and tylose may be mentioned as being preferred.

Gibberellins which can be present in the seed-dressing formulations which can be used in accordance with the invention are preferably the gibberellins A1, A3 (=gibberellic acid), A4 and A7; gibberellic acid is especially preferably used. The gibberellins are known (cf. R. Wegler "Chemie der Pflanzenschutz- and Schädlingsbekämpfungsmittel", vol. 2, Springer Verlag, 1970, pp. 401-412).

The seed dressing formulations usable in accordance with the invention can be used to treat a wide variety of different kinds of seed either directly or after prior dilution with water. For instance, the concentrates or the preparations obtainable therefrom by dilution with water can be used to dress the seed of cereals, such as wheat, barley, rye, oats, and triticale, and also the seed of maize, rice, oilseed rape, peas, beans, cotton, sunflowers, soya beans and beets, or else a wide variety of different vegetable seed. The seed dressing formulations usable in accordance with the invention, or the dilute use forms thereof, can also be used to dress seed of transgenic plants.

For treatment of seed with the seed dressing formulations usable in accordance with the invention, or the use forms prepared therefrom by adding water, all mixing units usable customarily for the seed dressing are useful. Specifically, the procedure in the seed dressing is to place the seed into a mixer, operated batch-wise or continously, to add the particular desired amount of seed dressing formulations, either as such or after prior dilution with water, and to mix everything until the formulation is distributed homogeneously on the seed. If appropriate, this is followed by a drying operation.

The application rate of the seed dressing formulations usable in accordance with the invention can be varied within a relatively wide range. It is guided by the particular content of the active compound combinations according to the invention in the formulations and by the seed. The application rates of the active compound combinations according to the invention are generally between 0.001 and 50 g per kilogram of seed, preferably between 0.01 and 15 g per kilogram of seed.

Vector Control

The active compound combinations according to the invention can also be used in vector control. For the purpose of the present invention, a vector is an arthropod, in particular an insect or arachnid, capable of transmitting pathogens such as, for example, viruses, worms, single-cell organisms and bacteria from a reservoir (plant, animal, human, etc.) to a host. The pathogens can be transmitted either mechanically (for example trachoma by non-stinging flies) to a host, or by injection (for example malaria parasites by mosquitoes) into a host.

Examples of vectors and the diseases or pathogens they transmit are:
1) Mosquitoes
Anopheles: malaria, filariasis;
Culex: Japanese encephalitis, other viral diseases, filariasis, transmission of other worms;
Aedes: yellow fever, dengue fever, other viral diseases, filariasis;
Simuliidae: transmission of worms, in particular Onchocerca volvulus;
Psychodidae: transmission of leishmaniasis
2) Lice: skin infections, epidemic typhus;
3) Fleas: plague, endemic typhus, cestodes;
4) Flies: sleeping sickness (trypanosomiasis); cholera, other bacterial diseases;
5) Mites: acariosis, epidemic typhus, rickettsialpox, tularaemia, Saint Louis encephalitis, tick-borne encephalitis (TBE), Crimean-Congo haemorrhagic fever, borreliosis;
6) Ticks: borrelioses such as *Borrelia burgdorferi* sensu lato., *Borrelia duttoni*, tick-borne encephalitis, Q fever (*Coxiella burnetii*), babesioses (*Babesia canis canis*), ehrlichiosis.

Examples of vectors in the sense of the present invention are insects, for example aphids, flies, leafhoppers or thrips, which are capable of transmitting plant viruses to plants. Other vectors capable of transmitting plant viruses are spider mites, lice, beetles and nematodes.

Further examples of vectors in the sense of the present invention are insects and arachnids such as mosquitoes, in particular of the genera *Aedes, Anopheles*, for example *A. gambiae, A. arabiensis, A. funestus, A. dirus* (malaria) and *Culex*, psychodids such as *Phlebotomus, Lutzomyia*, lice, fleas, flies, mites and ticks capable of transmitting pathogens to animals and/or humans.

Vector control is also possible if the active compound combinations according to the invention are resistance-breaking.

Active compound combinations according to the invention are suitable for use in the prevention of diseases and/or pathogens transmitted by vectors. Thus, a further aspect of the present invention is the use of active compound combinations according to the invention for vector control, for example in agriculture, in horticulture, in gardens and in leisure facilities, and also in the protection of materials and stored products.

Protection of Industrial Materials

The active compound combinations according to the invention are suitable for protecting industrial materials against attack or destruction by insects, for example from the orders Coleoptera, Hymenoptera, Isoptera, Lepidoptera, Psocoptera and Zygentoma.

Industrial materials in the present context are understood to mean inanimate materials, such as preferably plastics, adhesives, sizes, papers and cards, leather, wood, processed wood products and coating compositions. The use of the invention for protecting wood is particularly preferred.

In a further embodiment, the active compound combinations according to the invention are used together with at least one further insecticide and/or at least one fungicide.

In a further embodiment, the active compound combinations according to the invention are present as a ready-to-use pesticide, i.e. they can be applied to the material in question without further modifications. Suitable further insecticides or fungicides are in particular those mentioned above.

Surprisingly, it has also been found that the active compound combinations according to the invention can be employed for protecting objects which come into contact with saltwater or brackish water, in particular hulls, screens, nets, buildings, moorings and signalling systems, against fouling. Likewise, the active compound combinations according to the invention, alone or in combinations with other active compounds, can be used as antifouling agents.

The plants listed can be treated particularly advantageously according to the invention with the active compound combinations according to the invention. The preferred ranges given above in the active compound combinations also apply to the treatment of these plants. Particular emphasis is placed on the plant treatment with the active compound combinations specifically mentioned in the present text.

The good effect of the active compound combinations according to the invention is evident from the following examples. While the individual active substances have weaknesses in effect, the combinations show an effect which goes beyond a simple effect-summation. A synergistic effect is always present when the action of the active compound combinations is greater than the sum of the effects of the individually applied active compounds.

EXAMPLES

Formula for the Efficacy of the Combination of Two Compounds

The expected efficacy of a given combination of two compounds is calculated as follows (see Colby, S. R., "Calculating Synergistic and antagonistic Responses of Herbicide Combinations", Weeds 15, pp. 20-22, 1967):

If

X is the efficacy expressed in % mortality of the untreated control for test compound A at a concentration of m ppm respectively m g/ha, Y is the efficacy expressed in % mortality of the untreated control for test compound B at a concentration of n ppm respectively n g/ha, E is the efficacy expressed in % mortality of the untreated control using the mixture of A and B at m and n ppm respectively m and n g/ha, then is $$E = X + Y - \frac{X \times Y}{100}$$

If the observed insecticidal efficacy of the combination is higher than the one calculated as "E", then the combination of the two compounds is more than additive, i.e., there is a synergistic effect.

In all following examples, "*Bacillus firmus*" refers to *Bacillus firmus* strain CNCM I-1582 unless indicated otherwise.

Example A

*Tetranychus urticae*—Spray Test OP-Resistant
Solvent: 78.0 parts by weight acetone
1.5 parts by weight dimethylformamide
Emulsifier: alkylarylpolyglycol ether To produce a suitable preparation of active compound, 1 part by weight of active compound is mixed with the stated amount of solvents and is diluted with water, containing an emulsifier concentration of 1000 ppm, to the desired concentration. To produce a suitable preparation of a spore suspension the spores are diluted with emulsifier containing water to the desired concentration. Further test concentrations are prepared by dilution with emulsifier containing water.

French bean (*Phaseolus vulgaris*) leaf disks infected with all instars of the two spotted spidermite (*Tetranychus urticae*), are sprayed with a preparation of the active ingredient of the desired concentration.

After the specified period of time, mortality in % is determined. 100% means all spider mites have been killed and 0% means none of the spider mites have been killed. The mortality values determined thus are recalculated using the Colby-formula (see above).

According to the present application in this test e.g. the following combinations showed a synergistic effect in comparison to the single compounds:

TABLE A-1

*Tetranychus urticae* - spray test

| Active Ingredient | Concentration in g ai/ha | Efficacy in % after 2 days | |
|---|---|---|---|
| Compound (Cpd) of formula (I) | 0.5 | 0 | |
|  | 0.125 | 0 | |
| Acequinocyl | 1 | 0 | |
|  |  | obs.* | cal.** |
| Cpd of formula (I) + Acequinocyl (1:2) according to the invention | 0.5 + 1 | 70 | 0 |
| Compound (Cpd) of formula (IIa) | 0.05 | 0 | |
|  |  | obs.* | cal.** |
| Cpd of formula (I) + Cpd of formula (IIa) (10:1) according to the invention | 0.5 + 0.05 | 70 | 0 |
| Diafenthiuron | 0.5 | 0 | |
|  |  | obs.* | cal.** |

TABLE A-1-continued

*Tetranychus urticae* - spray test

| Active Ingredient | Concentration in g ai/ha | Efficacy in % after 2 days | |
|---|---|---|---|
| Cpd of formula (I) + Diafenthiuron (1:1) according to the invention | 0.5 + 0.5 | 100 | 0 |
| Tebufenpyrad | 0.5 | 0 | |
|  |  | obs.* | cal.** |
| Cpd of formula (I) + Tebufenpyrad (1:1) according to the invention | 0.5 + 0.5 | 90 | 0 |

TABLE A-2

*Tetranychus urticae* - spray test

| Active Ingredient | Concentration in g ai/ha | Efficacy in % after 6 days | |
|---|---|---|---|
| Cpd of formula (I) | 1.2 | 70 | |
|  | 0.6 | 0 | |
|  | 0.5 | 0 | |
|  | 0.3 | 0 | |
|  | 0.125 | 0 | |
| Acequinocyl | 1 | 0 | |
|  |  | obs.* | cal.** |
| Cpd of formula (I) + Acequinocyl (1:2) according to the invention | 0.5 + 1 | 70 | 0 |
| Cpd of formula (IIa) | 1.2 | 0 | |
|  | 0.05 | 0 | |
|  | 0.0125 | 0 | |
|  |  | obs.* | cal.** |
| Cpd of formula (I) + Cpd of formula (IIa) (1:2) (10:1) (10:1) according to the invention | 0.6 + 1.2 | 90 | 0 |
|  | 0.5 + 0.05 | 100 | 0 |
|  | 0.125 + 0.0125 | 70 | 0 |
| Bifenazate | 1.8 | 0 | |
|  | 0.25 | 0 | |
|  |  | obs.* | cal.** |
| Cpd of formula (I) + Bifenazate (1:3) according to the invention | 0.6 + 1.8 | 70 | 0 |
| Diafenthiuron | 3 | 0 | |
|  | 0.5 | 0 | |
|  |  | obs.* | cal.** |
| Cpd of formula (I) + Diafenthiuron (1:1) (1:10) according to the invention | 0.5 + 0.5 | 70 | 0 |
|  | 0.3 + 3 | 90 | 0 |
| Fenazaquin | 2.4 | 0 | |
|  | 1.2 | 0 | |
|  |  | obs.* | cal.** |
| Cpd of formula (I) + Fenazaquin (1:4) (1:4) according to the invention | 0.6 + 2.4 | 90 | 0 |
|  | 0.3 + 1.2 | 90 | 0 |
| Fenpyroximate | 0.2 | 0 | |
|  |  | obs.* | cal.** |
| Cpd of formula (I) + Fenpyroximate (3:1) according to the invention | 0.6 + 0.2 | 90 | 0 |
| Methiocarb | 12 | 0 | |
|  | 6 | 0 | |
|  |  | obs.* | cal.** |
| Cpd of formula (I) + Methiocarb (1:20) (1:20) according to the invention | 0.6 + 12 | 90 | 0 |
|  | 0.3 + 6 | 70 | 0 |
| Pyridaben | 0.5 | 0 | |
|  |  | obs.* | cal.** |
| Cpd of formula (I) + Pyridaben (1:1) according to the invention | 0.5 + 0.5 | 90 | 0 |
| Requiem | 18 | 0 | |
|  |  | obs.* | cal.** |
| Cpd of formula (I) + Requiem (1:30) according to the invention | 0.6 + 18 | 70 | 0 |
| Tebufenpyrad | 0.5 | 0 | |
|  |  | obs.* | cal.** |
| Cpd of formula (I) + Tebufenpyrad (1:1) according to the invention | 0.5 + 0.5 | 90 | 0 |
|  | 0.125 + 0.125 | 70 | 0 |

*obs. = observed insecticidal efficacy,
**cal. = efficacy calculated with Colby-formula

Example B

*Tetranychus urticae*—Spray Test; OP-Resistant

Solvent: 7 parts by weight of dimethylformamide

Emulsifier: alkylaryl polyglycol ether

To produce a suitable preparation of active compound, 1 part by weight of active compound is mixed with the stated amount of solvent and is diluted with water, containing an emulsifier concentration of 1000ppm, to the desired concentration. Further test concentrations are prepared by dilution with emulsifier containing water.

Bean plants (*Phaseolus vulgaris*) which are heavily infested with all stages of the two-spotted spider mite (*Tetranychus urticae*) are treated by being sprayed with the preparation of the active compound of the desired concentration.

After the specified period of time mortality in % is determined. 100% means all the spider mites have been killed and 0% means none of the spider mites have been killed. The mortality values determined thus are recalculated using the Colby-formula (see above).

According to the present application in this test e.g. the following combinations showed a synergistic effect in comparison to the single compounds:

TABLE B-1

*Tetranychus urticae* - spray test

| Active Ingredient | Concentration in ppm | Efficacy in % after 3 days | |
|---|---|---|---|
| Cpd of formula (I) | 0.4 | 0 | |
| Requiem | 4 | 0 | |
| | | obs.* | cal.** |
| Cpd of formula (I) + Requiem (1:10) according to the invention | 0.4 + 4 | 30 | 0 |

TABLE B-2

*Tetranychus urticae* - spray test

| Active Ingredient | Concentration in ppm | Efficacy in % after 4 days | |
|---|---|---|---|
| Cpd of formula (I) | 0.8 | 25 | |
| | 0.4 | 0 | |
| MET 52 - Metarhizium anisopliae strain F52 (5.5 x 109 spores/ml) | 8 | 0 | |
| | 4 | 0 | |
| | | obs.* | cal.** |
| Cpd of formula (I) + MET 52 (1:10) according to the invention | 0.8 + 8 | 75 | 25 |
| | 0.4 + 4 | 40 | 0 |

TABLE B-3

*Tetranychus urticae* - spray test

| Active Ingredient | Concentration in ppm | Efficacy in % after 7 days | |
|---|---|---|---|
| Cpd of formula (I) | 0.8 | 30 | |
| | 0.4 | 10 | |
| | 0.2 | 0 | |
| Cpd of formula (IIa) | 0.4 | 55 | |
| | 0.2 | 10 | |
| | | obs.* | cal.** |
| Cpd of formula (I) + Cpd of formula (IIa) (1:1) according to the invention | 0.4 + 0.4 | 87.5 | 59.5 |
| | 0.2 + 0.2 | 45 | 10 |
| Bifenazate | 2 | 65 | |
| | | obs.* | cal.** |
| Cpd of formula (I) + Bifenazate (1:5) according to the invention | 0.4 + 2 | 95 | 68.5 |
| Diafenthiuron | 3.2 | 15 | |
| | | obs.* | cal.** |
| Cpd of formula (I) + Diafenthiuron (1:8) according to the invention | 0.4 + 3.2 | 65 | 23.5 |

*obs. = observed insecticidal efficacy,
**cal. = efficacy calculated with Colby-formula

Example C

*Meloidogyne incognita*—Test

Solvent: 125.0 parts by weight of acetone

To produce a suitable preparation of active compound, 1 part by weight of active compound is mixed with the stated amount of solvent, and the concentrate is diluted with water to the desired concentration.

To produce a suitable preparation of a spore suspension the spores are diluted with water to the desired concentration.

Vessels are filled with sand, a solution of the active ingredient, a suspension containing eggs and larvae of the southern root-knot nematode (*Meloidogyne incognita*) and salad seeds. The salad seeds germinate and the seedlings grow. Galls develop in the roots.

After the specified period of time nematicidal activity is determined on the basis of the percentage of gall formation. 100% means no galls were found and 0% means the number of galls found on the roots of the treated plants was equal to that in untreated control plants.

According to the present application in this test e.g. the following combinations showed a synergistic effect in comparison to the single compounds:

TABLE C

*Meloidogyne incognita* - test

| Active Ingredient | Concentration in ppm | Efficacy in % after 14 days | |
|---|---|---|---|
| Cpd of formula (I) | 2 | 70 | |
| | 1 | 0 | |
| Fluazaindolizine | 0.025 | 0 | |
| | | obs.* | cal.** |
| Cpd of formula (I) + Fluazaindolizine (40:1) according to the invention | 1 + 0.025 | 90 | 0 |
| *Bacillus firmus* | 30 | 0 | |
| | | obs.* | cal.** |
| Cpd of formula (I) + *Bacillus firmus* (1:30) according to the invention | 1 + 30 | 90 | 0 |
| BioAct WG | 60 | 0 | |
| | | obs.* | cal.** |
| Cpd of formula (I) + BioAct WG (1:30) according to the invention | 2 + 60 | 100 | 70 |
| Cpd of formula (IIb) (=N-[1-(2,6-difluorophenyl)-1 H-pyrazol-3-yl]-2-(trifluoromethyl)benzamide) | 1.5 | 0 | |
| | | obs.* | cal.** |

TABLE C-continued

Meloidogyne incognita - test

| Active Ingredient | Concentration in ppm | Efficacy in % after 14 days | |
|---|---|---|---|
| Cpd of formula (I) + Cpd of formula (IIb) (1:1.5) according to the invention | 1 + 1.5 | 70 | 0 |
| Fluensulfone | 0.2 | 0 | |
| | 0.1 | 0 | |
| | | obs.* | cal.** |
| Cpd of formula (I) + Fluensulfone (10:1) according to the invention | 2 + 0.2 | 100 | 70 |
| | 1 + 0.1 | 90 | 0 |

Example D

Meloidogyne incognita—Test

Solvent: 7 parts by weight of dimethylformamide

Emulsifier: 2.5 parts by weight of alkylarylpolyglycolether

To produce a suitable preparation of active compound, 1 part by weight of active compound is mixed with the stated amount of solvent and emulsifier and is diluted with water to the desired concentration. To produce a suitable preparation of a spore suspension the spores are diluted with emulsifier containing water to the desired concentration. In the calculation of the concentration the soil volume has to be included. Care has to be taken that the emulsifier concentration in the soil does not exceed 20 ppm. Further test concentrations are prepared by dilution with water.

The compound solution is poured into pots filled with soil (loamy sand). A suspension containing eggs and larvae of the southern root-knot nematode (Meloidogyne incognita) is added, salad seeds are spread on the soil surface and covered with quartz sand. The salad seeds germinate and the seedlings grow. Galls develop on the roots.

After the specified period of time the nematicidal activity is determined on the basis of the percentage of gall formation. 100% means no galls were found; 0% means the number of galls found on the roots of the treated plants was equal to that in untreated control plants. The activity determined thus is recalculated using the Colby-formula (see above).

According to the present application in this test e.g. the following combinations showed a synergistic effect in comparison to the single compounds:

TABLE D

Meloidogyne incognita - test

| Active Ingredient | Concentration in ppm | Efficacy in % after 20 days | |
|---|---|---|---|
| Cpd of formula (I) | 20 | 15 | |
| | 10 | 0 | |
| Fluopyram | 0.08 | 0 | |
| | 0.04 | 0 | |
| | | obs.* | cal.** |
| Cpd of formula (I) + Fluopyram 250:1 according to the invention | 20 + 0.08 | 90 | 15 |
| | 10 + 0.04 | 65 | 0 |
| Fluensulfone | 0.4 | 0 | |
| | | obs.* | cal.** |

TABLE D-continued

Meloidogyne incognita - test

| Active Ingredient | Concentration in ppm | Efficacy in % after 20 days | |
|---|---|---|---|
| Cpd of formula (I) + Fluensulfone 50:1 according to the invention | 20 + 0.4 | 90 | 15 |
| Fluazaindolizine | 0.4 | 40 | |
| | 0.2 | 0 | |
| | | obs.* | cal.** |
| Cpd of formula (I) + Fluazaindolizine 50:1 according to the invention | 20 + 0.4 | 100 | 49 |
| | 10 + 0.2 | 65 | 0 |
| Cpd of formula (IIb) | 0.4 | 0 | |
| | | obs.* | cal.** |
| Cpd of formula (I) + Cpd of formula (IIb) 50:1 according to the invention | 20 + 0.4 | 100 | 15 |
| Tioxazafen | 1.25 | 0 | |
| | | obs.* | cal.** |
| Cpd of formula (I) + Tioxazafen 8:1 according to the invention | 10 + 1.25 | 75 | 0 |

*obs. = observed insecticidal efficacy,
**cal. = efficacy calculated with Colby-formula

The invention claimed is:

1. An active compound combination comprising a compound of formula (I):

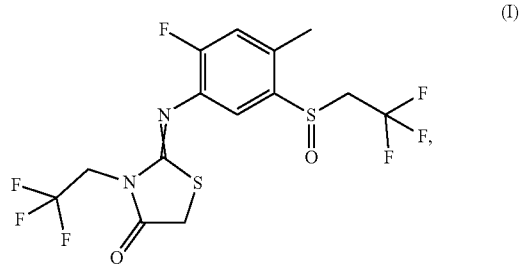 [SMILES: Cc1cc(F)c(N=C2SCC(=O)N2CC(F)(F)F)cc1S(=O)CC(F)(F)F]

and at least one active agent of group (II), wherein the active agent is selected from the group consisting of:
(II-1) methiocarb, (II-17) diafenthiuron, (II-18) acequinocyl, (II-19) fenazaquin, (II-20) fenpyroximate, (II-21) pyridaben, (II-22) tebufenpyrad, (II-24) fluopyram, (II-25) fluazaindolizine, (II-26) fluensulfone, (II-27) tioxazafen, (II-28) bifenazate, (II-31) a formulation comprising the three terpenes α-terpinene, p-cymene and limonene in a total amount of 15-18% (w/w) terpenes, a compound of formula (IIa):

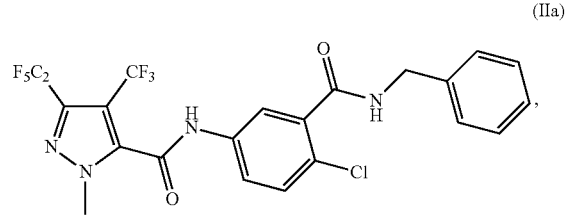

-continued

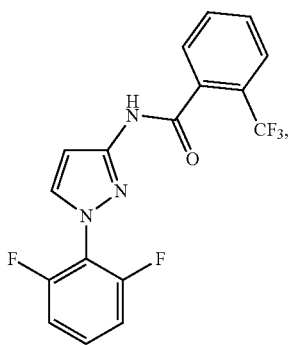

(IIb)

a compound of formula (IIb):
(1.34) *Bacillus firmus*,
(2.54) *Metarhizium anisopliae*,
(2.73) *Paecilomyces lilacinus*, and
(7.24) natural extract or simulated blend of *Chenopodium ambrosioides* which contains a mixture of three terpenes;
wherein the active compound combination is synergistically active.

2. The active compound combination according to claim 1,
wherein the at least one active agent of group (II) is selected from the group consisting of (II-1) Methiocarb, (II-17) diafenthiuron, (II-18) acequinocyl, (II-19) fenazaquin, (II-20) fenpyroximate, (II-21) pyridaben, (II-22) tebufenpyrad, (II-24) Fluopyram, (II-25) Fluazaindolizine, (II-26) Fluensulfone, (II-27) Tioxazafen, (II-28) Bifenazate, and (II-31) a formulation comprising a-terpinene, p-cymene and limonene in a total amount of 15- 18%.

3. The active compound combination according to claim 1, wherein the at least one active agent of group (II) is selected from the group consisting of the compound of formula (IIa) and the compound of formula (IIb).

4. The active compound combination according to claim 1, wherein the at least one active agent of group (II) is selected from the group consisting of
(2.54) *Metarhizium anisopliae*,
(2.73) *Paecilomyces lilacinus*, and
(7.24) natural extract or simulated blend of *Chenopodium ambrosioides* which contains a mixture of three terpenes.

5. The active compound combination according to claim 1, wherein the compound of the formula (I) is present in form of its (+) enantiomer.

6. A method for controlling an animal pest, comprising allowing the active compound combination according to claim 1, to act on the animal pest and/or its habitat.

7. The method according to claim 6, wherein the animal pest is an insect or arachnid or acarid pest.

8. A method for controlling a microbial pest, comprising allowing the active compound combination according to claim 1, to act on the microbial pest and/or its habitat.

9. A method for controlling a nematode, comprising allowing the active compound combination according to claim 1, to act on the nematode and/or its habitat nematodes.

10. A method for plant-strengthening, comprising allowing the active compound combination according to claim 1, to act on the plant, its parts, and/or its surroundings, habitat, or storage space.

11. A method for seed treatment, comprising applying the active compound combination according to claim 1, to a seed.

12. A method for controlling an animal or a microbial pest, comprising allowing the active compound combination according to claim 1, to act on the animal or the microbial pest and/or its habitat.

13. The method according to claim 12, wherein the animal pest is an insect or arachnid or acarid pest.

14. A process for preparing a crop protection agent, comprising mixing the active compound combination according to claim 1, with an extender and/or a surfactant.

15. A method for treating a plant or parts thereof selected from the group consisting of citrus, pome fruits, stone fruits, tropical fruits, nuts, berries, vegetables, cotton, soybean, grape, tea, coffee, maize, rice, and ornamentals, comprising allowing the active compound combination according to claim 1, to act on the plant or parts thereof.

16. The method according to claim 10, wherein the plant is a transgenic plant.

17. The method according to claim 11, wherein the seed is a transgenic seed.

18. The active compound combination according to claim 1, wherein the compound of the formula (I) is present in form of a mixture of its (+) enantiomer and its (−) enantiomer which is enriched in the (+) enantiomer.

19. The active compound combination of claim 1, wherein:
when the active agent of group (II) is (II-1) methiocarb, (II-17) diafenthiuron, (II-18) acequinocyl, (II-19) fenazaquin, (II-20) fenpyroximate, (II-21) pyridaben, (II-22) tebufenpyrad, (II-25) fluazaindolizine, (II-26) fluensulfone, (II-27) tioxazafen, (II-28) bifenazate, (II-31) a formulation comprising the three terpenes α-terpinene, p-cymene and limonene in a total amount of 15-18% (w/w) terpenes, a compound of formula (IIa), or a compound of formula (IIb),
then the active compound combination has a ratio of the compound of formula (I) and the active agent of group (II) from 50:1 to 1:50 by weight;
when the active agent of group (II) is (II-24) fluopyram, then the active compound combination has a ratio of the compound of formula (I) to (II-24) fluopyram from 250:1 to 1:10 by weight;
when the active agent of group (II) is (1.34) *Bacillus Firmus* or (2.73) *Paecilomyces lilacinus*, then the active compound combination has a ratio of the compound of formula (I) and the active agent of group (II) from 5:1 to 1:10 by weight;
when the active agent of group (II) is (2.54) *Metarhizium anisopliae*, then the active compound combination has a ratio of the compound of formula (I) and the active agent of group (II) from 5:1 to 1:10 by weight;
when the active agent of group (II) is (7.24) natural extract or simulated blend of *Chenopodium ambrosioides* which contains a mixuture of three terpenes, then the active compound combination has a ratio of the compound of formula (I) and the active agent of group (II) from 10:1 to 1:30 by weight.

20. The active compound combination according to claim 19, wherein the compound of the formula (I) is present in form of its (+) enantiomer.

21. The active compound combination according to claim 19, wherein the compound of the formula (I) is present in form of a mixture of its (+) enantiomer and its (−) enantiomer which is enriched in the (+) enantiomer.

22. The active compound combination according to claim 21, wherein the compound of the formula (I) is present in the form of a mixture of its (+) enantiomer and its (−) enantiomer in a ratio of at least 60:40 (+):(−) enantiomer.

23. The active compound combination according to claim 1, wherein the compound of the formula (I) is present in the form of a mixture of its (+) enantiomer and its (−) enantiomer in a ratio of at least 60:40 (+):(−) enantiomer.

24. The active compound combination according to claim 1, wherein the at least one active agent of group (II) is (II-1) methiocarb.

25. The active compound combination according to claim 1, wherein the at least one active agent of group (II) is (II-17) diafenthiuron.

26. The active compound combination according to claim 1, wherein the at least one active agent of group (II) is (II-18) acequinocyl.

27. The active compound combination according to claim 1, wherein the at least one active agent of group (II) is (II-19) fenazaquin.

28. The active compound combination according to claim 1, wherein the at least one active agent of group (II) is (II-20) fenpyroximate.

29. The active compound combination according to claim 1, wherein the at least one active agent of group (II) is (II-21) pyridaben.

30. The active compound combination according to claim 1, wherein the at least one active agent of group (II) is (11-22) tebufenpyrad.

31. The active compound combination according to claim 1, wherein the at least one active agent of group (II) is (11-24) fluopyram.

32. The active compound combination according to claim 1, wherein the at least one active agent of group (II) is (11-25) fluazaindolizine.

33. The active compound combination according to claim 1, wherein the at least one active agent of group (II) is (11-26) fluensulfone.

34. The active compound combination according to claim 1, wherein the at least one active agent of group (II) is (II-27) tioxazafen.

35. The active compound combination according to claim 1, wherein the at least one active agent of group (II) is (II-28) bifenazate.

36. The active compound combination according to claim 1, wherein the at least one active agent of group (II) is (II-31) a formulation comprising the three terpenes α-terpinene, p-cymene and limonene in a total amount of 15-18% (w/w) terpenes.

37. The active compound combination according to claim 36, wherein the at least one active agent of group (II) is a formulation comprising α-terpinene, p-cymene and limonene in a total amount of 16.75% (w/w) terpenes.

38. The active compound combination according to claim 1, wherein the at least one active agent of group (II) is the compound of formula (IIa).

39. The active compound combination according to claim 1, wherein the at least one active agent of group (II) is a compound of formula (IIb).

40. The active compound combination according to claim 1, wherein the at least one active agent of group (II) is (1.34) *Bacillus firmus*.

41. The active compound combination according to claim 1, wherein the at least one active agent of group (II) is (2.54) *Metarhizium anisopliae*.

42. The active compound combination according to claim 1, wherein the at least one active agent of group (II) is (2.73) *Paecilomyces lilacinus*.

43. The active compound combination according to claim 1, wherein the at least one active agent of group (II) is (7.24) natural extract or simulated blend of *Chenopodium ambrosioides* which contains a mixture of three terpenes.

44. The active compound combination according to claim 43, wherein the natural extract or simulated blend of *Chenopodium ambrosioides* contains a mixture of α-terpinene, p-cymene and limonene.

\* \* \* \* \*